(12) United States Patent
Iwasaki et al.

(10) Patent No.: US 10,483,519 B2
(45) Date of Patent: Nov. 19, 2019

(54) BATTERY PACK AND BATTERY PACK MANUFACTURING METHOD

(71) Applicant: Nissan Motor Co., Ltd., Yokohama-shi, Kanagawa (JP)

(72) Inventors: Takao Iwasaki, Kanagawa (JP); Yasuhiro Yanagihara, Kanagawa (JP); Masayuki Nakai, Kanagawa (JP); Masahiro Nakamoto, Kanagawa (JP); Yusuke Tsuji, Kanagawa (JP); Manato Itabashi, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 15/769,804

(22) PCT Filed: Oct. 22, 2015

(86) PCT No.: PCT/JP2015/079898
§ 371 (c)(1),
(2) Date: Apr. 20, 2018

(87) PCT Pub. No.: WO2017/068703
PCT Pub. Date: Apr. 27, 2017

(65) Prior Publication Data
US 2018/0309110 A1    Oct. 25, 2018

(51) Int. Cl.
*H01M 2/02* (2006.01)
*H01M 2/10* (2006.01)
*H01M 2/20* (2006.01)
*H01M 2/26* (2006.01)
*H01M 2/30* (2006.01)
*H01M 2/18* (2006.01)

(52) U.S. Cl.
CPC ......... *H01M 2/266* (2013.01); *H01M 2/0212* (2013.01); *H01M 2/1016* (2013.01); *H01M 2/1077* (2013.01); *H01M 2/18* (2013.01); *H01M 2/202* (2013.01); *H01M 2/206* (2013.01); *H01M 2/30* (2013.01); *H01M 2/1061* (2013.01)

(58) Field of Classification Search
CPC ............. H01M 2/0212; H01M 2/1016; H01M 2/1061; H01M 2/1077; H01M 2/18; H01M 2/202; H01M 2/206; H01M 2/266; H01M 2/30; H01M 2/0245
See application file for complete search history.

(56) References Cited

U.S. PATENT DOCUMENTS

| | | | | |
|---|---|---|---|---|
| 7,976,980 B2 * | 7/2011 | Yoon | ................... | H01M 2/1077 29/623.1 |
| 9,356,278 B2 | 5/2016 | Suzuki | | |
| 2004/0185332 A1 * | 9/2004 | Botos | ...................... | H01M 2/26 429/96 |
| 2007/0281208 A1 | 12/2007 | Yoon et al. | | |
| 2010/0196753 A1 * | 8/2010 | Heo | ....................... | H01M 2/202 429/158 |
| 2012/0100400 A1 * | 4/2012 | Kang | .................. | H01M 2/1077 429/7 |
| 2012/0231300 A1 * | 9/2012 | Park | .................... | H01M 10/425 429/7 |
| 2013/0040178 A1 * | 2/2013 | Lim | .................... | H01M 2/0242 429/94 |
| 2013/0130087 A1 * | 5/2013 | Kawaguchi | ......... | H01M 2/1077 429/120 |
| 2013/0196211 A1 * | 8/2013 | Park | ........................ | H01M 2/30 429/156 |
| 2013/0230761 A1 * | 9/2013 | Okutani | ................ | H01M 2/206 429/158 |
| 2015/0179995 A1 * | 6/2015 | Nakamura | ........... | H01M 2/1016 429/120 |
| 2016/0149256 A1 * | 5/2016 | Leroux | ................. | H01M 2/206 429/153 |
| 2018/0287110 A1 * | 10/2018 | Yanagihara | ............. | H01M 2/10 |

FOREIGN PATENT DOCUMENTS

| | | |
|---|---|---|
| CN | 1819318 A | 8/2006 |
| CN | 202308134 U | 7/2012 |
| FR | 3 008 549 * | 1/2015 |
| JP | 2012-515418 A | 7/2012 |
| JP | 2013-229266 A | 11/2013 |
| JP | 2014-22195 A | 2/2014 |
| JP | 2014-110219 A | 6/2014 |
| KR | 10-2013-0076501 A | 7/2013 |
| KR | 10-2014-0102837 * | 3/2014 |
| WO | 2007/121445 A2 | 10/2007 |
| WO | 2012/131801 A1 | 10/2012 |

OTHER PUBLICATIONS

Machine translation of KR 10-2014-0102837, published on Mar. 24, 2014 (Year: 2014).*

* cited by examiner

*Primary Examiner* — Anca Eoff
(74) *Attorney, Agent, or Firm* — Global IP Counselors, LLC

(57) ABSTRACT

A battery pack has a cell group and a bus bar. The cell group is stacking a plurality of unit cells in a thickness direction. The unit cells each includes a cell body having a power generation element and a flat shape, and an electrode tab protruding out from the cell body. The electrode tabs have distal end portions bent in a stacking direction of the unit cells. The flat plate shape bus bar connects the distal end portions of the electrode tabs of the unit cells while facing the distal end portions, and electrically connects the electrode tabs of at least two of the unit cells with each other.

10 Claims, 19 Drawing Sheets

BATTERY PACK AND BATTERY PACK MANUFACTURING METHOD

CROSS-REFERENCE TO RELATED APPLICATIONS

This application is a U.S. National stage application of International Application No. PCT/JP2015/079898, filed on Oct. 22, 2015.

BACKGROUND

Field of the Invention

The present invention relates to a battery pack in which a plurality of unit cells are stacked, and a manufacturing method of the battery pack.

Background Information

Conventionally, there is a battery pack in which a plurality of unit cells are stacked (see Japanese Laid Open Patent Application No. 2012-515418—hereinafter referred to as Patent Document 1). The unit cells comprise electrode tabs to and from which electric power is input and output. The electrode tabs of the unit cells are electrically connected by a bus bar having electrical conductivity.

In Patent Document 1, the electrode tab of the unit cell protrudes in a direction that is orthogonal to the stacking direction of the unit cells. On the other hand, the bus bar comprises recessed portions and protruding portions that are formed in a wave shape with respect to a direction that is orthogonal to the stacking direction so as to independently sandwich each of the electrode tabs along the stacking direction. The electrode tab of each unit cell is bonded to the bus bar in a state of being independently inserted into the plurality of recessed portions of the bus bar.

SUMMARY

According to the configuration of Patent Document 1, if there is variation in the thicknesses of the unit cells to be stacked, the positions of the electrode tabs of the unit cells deviate relatively from the positions of the recessed portions of the bus bar. In such a case there occur electrode tabs that cannot be sufficiently inserted into the recessed portions of the bus bar. Said electrode tabs are insufficiently bonded to the bus bar, and there is the risk that electrical conductivity cannot be secured.

An object of the present invention is to provide a battery pack in which sufficient conduction can be obtained between a bus bar and the electrode tab of each unit cell, and a manufacturing method of the battery pack.

The battery pack of the present invention for achieving the object described above comprises a cell group and a bus bar. The cell group is obtained by stacking, in the thickness direction, a plurality of unit cells provided with a cell body, which includes a power generation element and which is formed into a flat shape and an electrode tab protruding from the cell body, and the distal end portion of the electrode tabs is bent in the stacking direction of the unit cells. The bus bar is formed to have a flat plate shape and is bonded to the distal end portions of the electrode tabs of the unit cells while facing the distal end portions, and it electrically connects the electrode tabs of at least two of the unit cells with each other.

The manufacturing method of the battery pack of the present invention for achieving the object described above is a manufacturing method in which a unit cell provided with a cell body, which includes a power generation element and which is formed into a flat shape and an electrode tab protruding from the cell body and the distal end portion of which is bent in the thickness direction of the cell body, and a flat plate shaped bus bar that electrically connects the distal end portions of the unit cells are bonded. In this battery pack manufacturing method, the bus bar, and each of the distal end portions of the electrode tabs of at least two of the plurality of unit cells that are stacked along the thickness direction, are brought into contact while facing each other and welded.

DETAILED DESCRIPTION OF EMBODIMENTS

Figure 1:
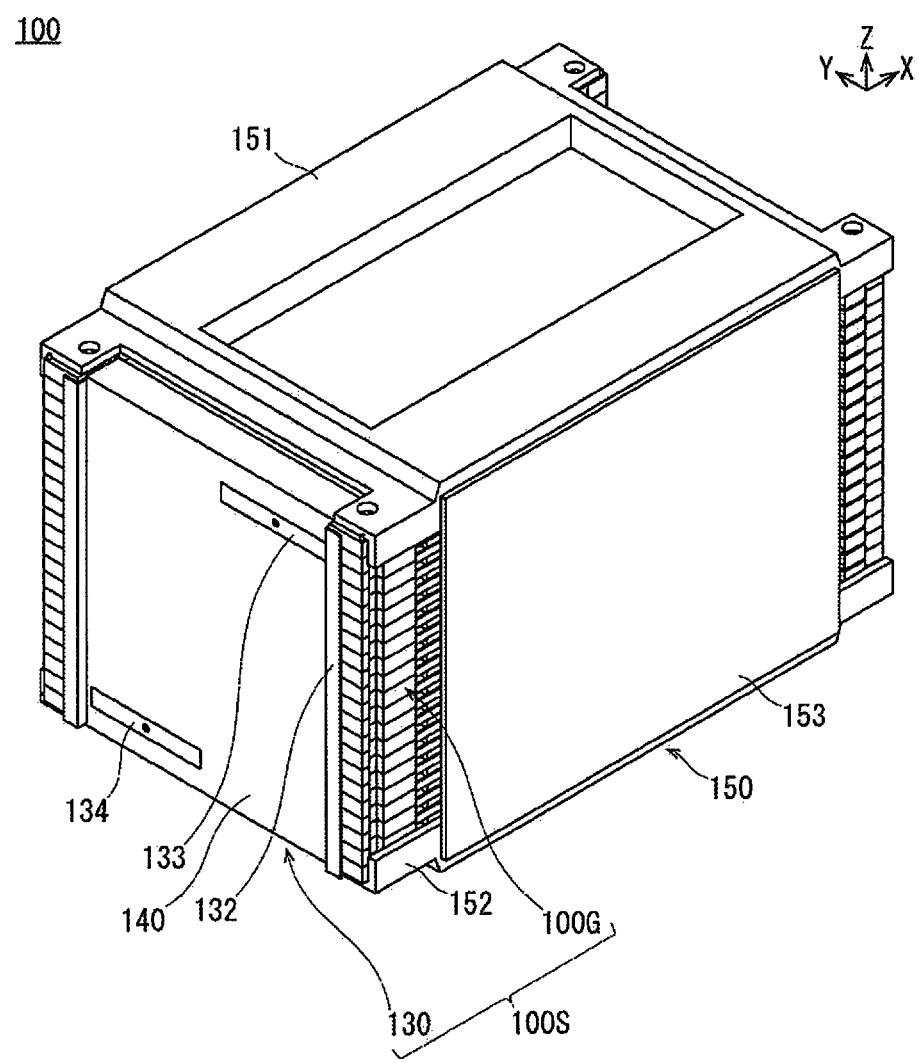
FIG. 1 is a perspective view illustrating the battery pack according to the first embodiment.

Embodiments of the present invention will be explained below, with reference to the appended drawings. In the explanations of the drawings, the same elements are given the same reference symbols, and overlapping explanations are omitted. The sizes and ratios of the members in the drawing are exaggerated for convenience of explanation, and may be different from the actual sizes and ratios. The orientation is shown using arrows indicated by X, Y, and Z in the drawings. The direction of the arrow indicated by X indicates a direction that intersects with the stacking direction of the unit cell 110, and a direction along the longitudinal direction of the unit cell 110. The direction of the arrow indicated by Y indicates a direction that intersects with the stacking direction of the unit cell 110, and a direction along the short side direction of the unit cell 110. The direction of the arrow indicated by Z is the stacking direction of the unit cell 110.

First Embodiment

First, a battery pack 100 according to the first embodiment will be described with reference to FIGS. 1-9.

Figure 2:
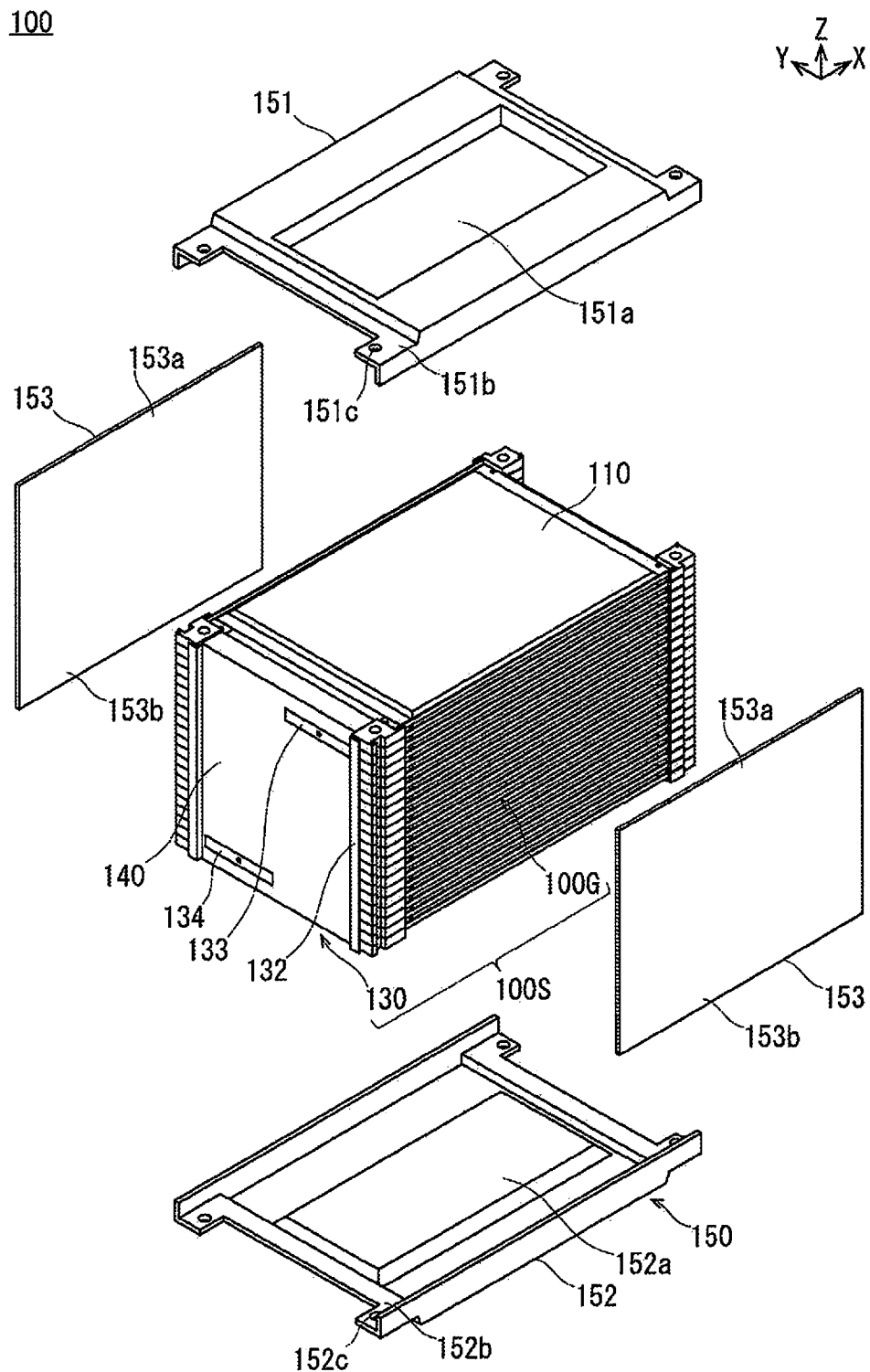
FIG. 2 is a perspective view illustrating a state in which the entire stack, in a state in which an upper pressure plate, a lower pressure plate, and left and right side plates are disassembled from the battery pack illustrated in FIG. 1 and a protective cover is attached thereto, is exposed.
Figure 3:
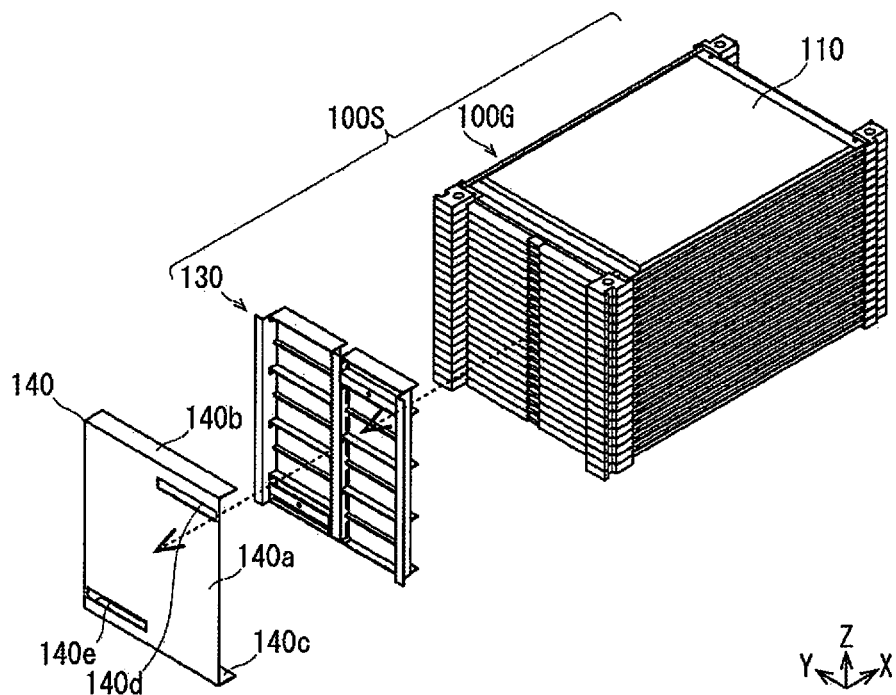
FIG. 3 is a perspective view illustrating a state in which the protective cover is detached from the stack illustrated in FIG. 2, and the stack is disassembled into a cell group and a bus bar unit.
Figure 4:
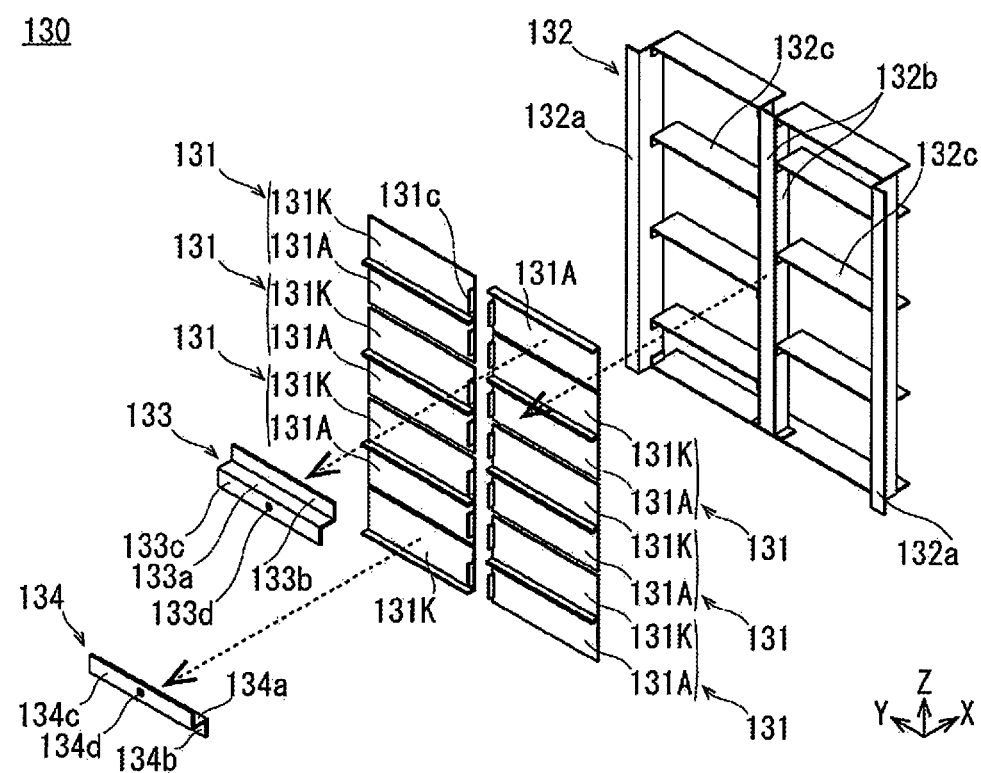
FIG. 4 is an exploded perspective view illustrating the bus bar unit illustrated in FIG. 3.
Figure 5:
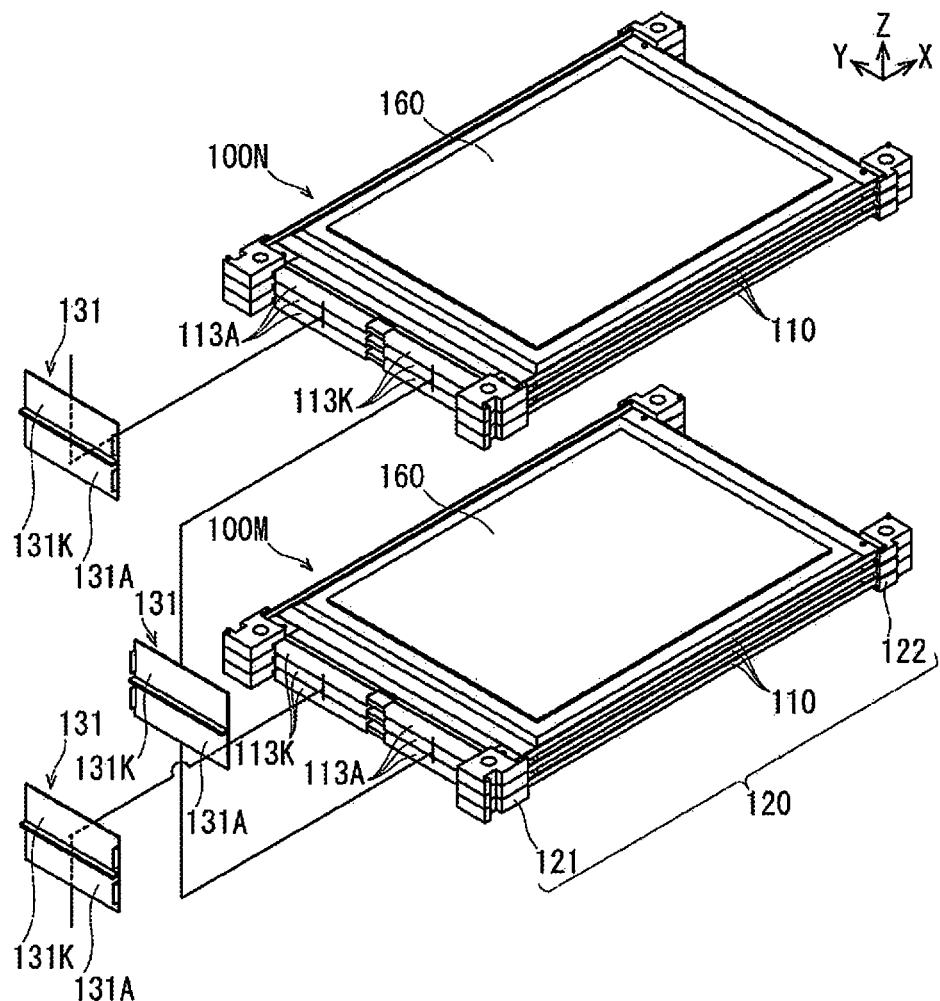
FIG. 5 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are bonded by means of a bus bar.
Figure 6A:
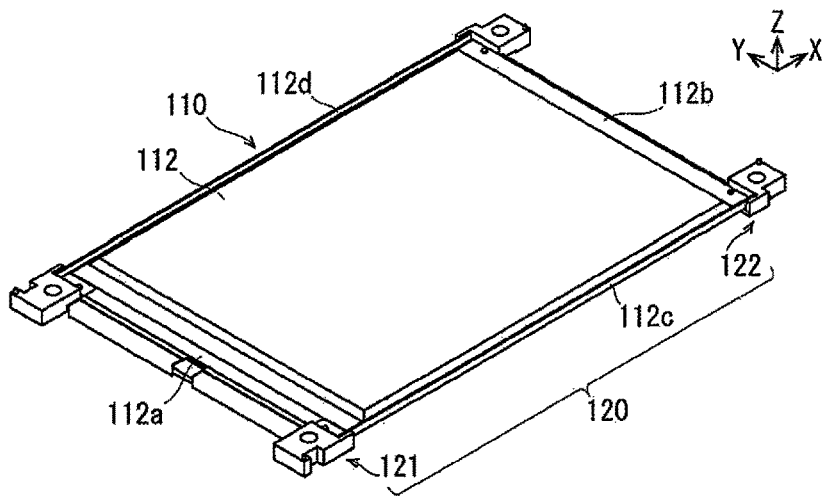
FIG. 6A is a perspective view illustrating a state in which a pair of spacers (first spacer and second spacer) are attached to a unit cell.
Figure 6B:
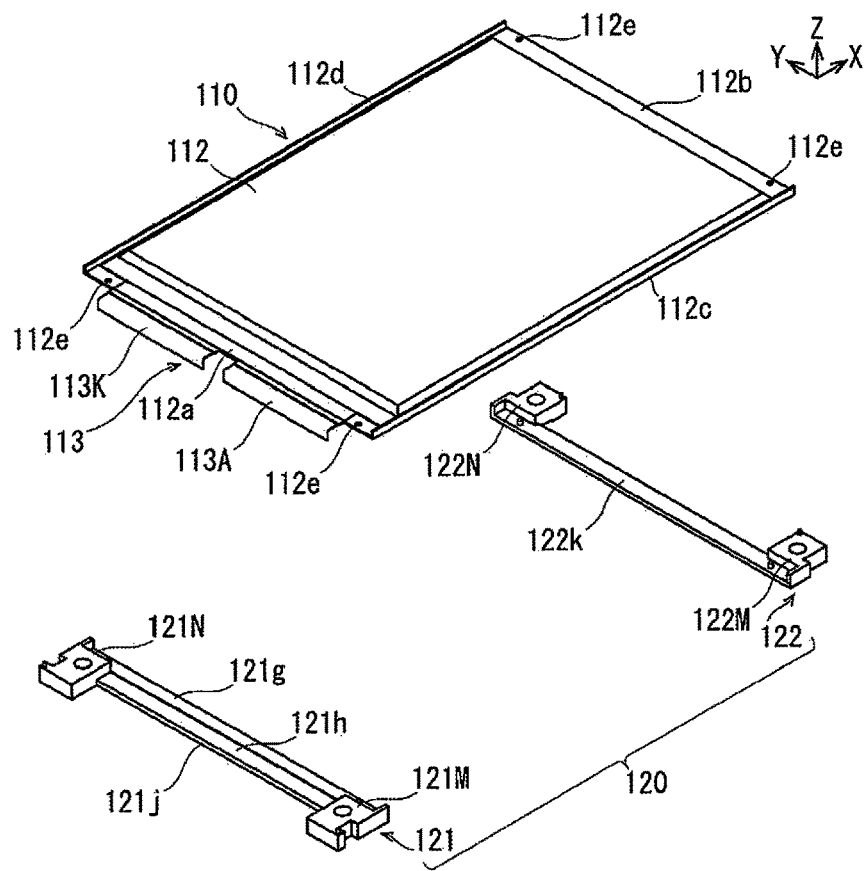
FIG. 6B is a perspective view illustrating a state before the pair of spacers (first spacer and second spacer) are attached to the unit cell.
Figure 7:
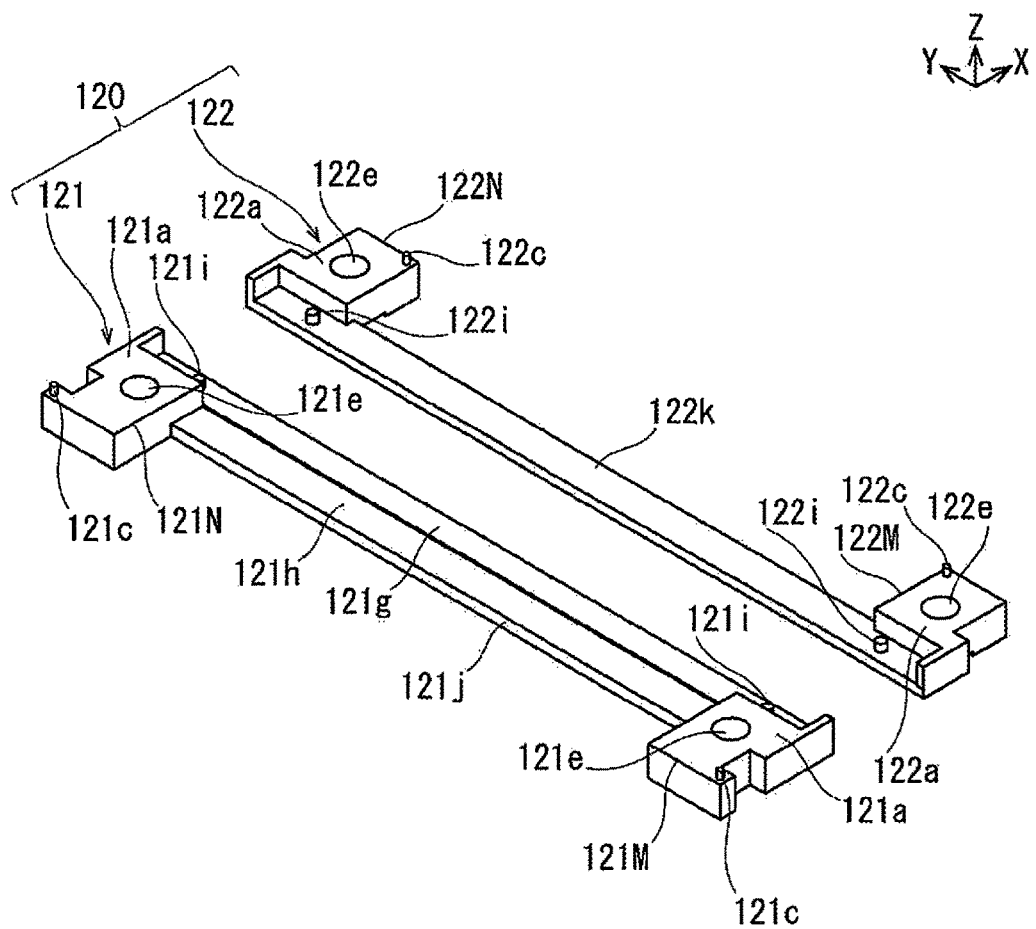
FIG. 7 is a perspective view illustrating the pair of spacers (first spacer and second spacer).
Figure 8A:
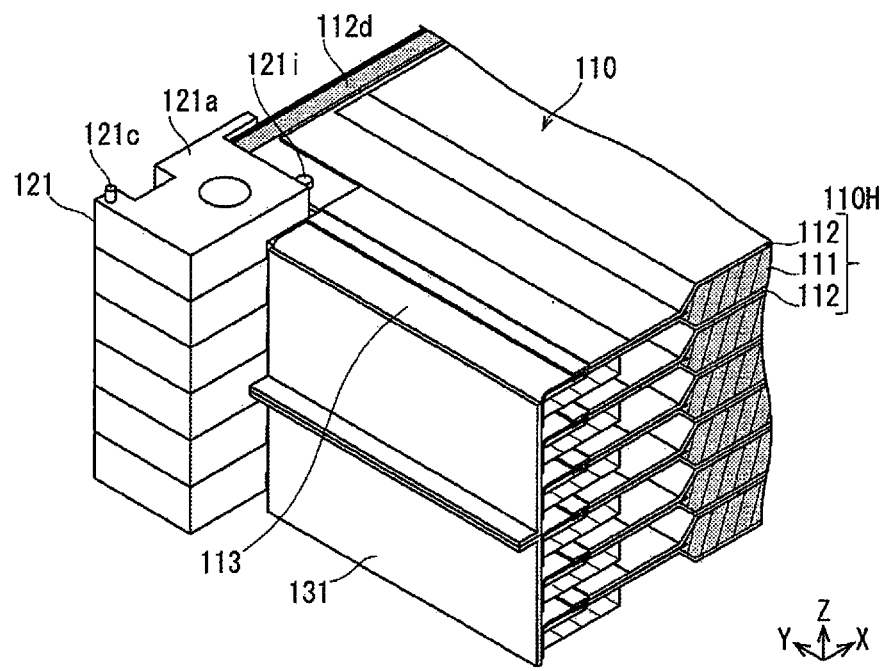
FIG. 8A is a perspective view illustrating a cross-section of the principle part of a state in which a bus bar is bonded to the electrode tabs of stacked unit cells.
Figure 8B:
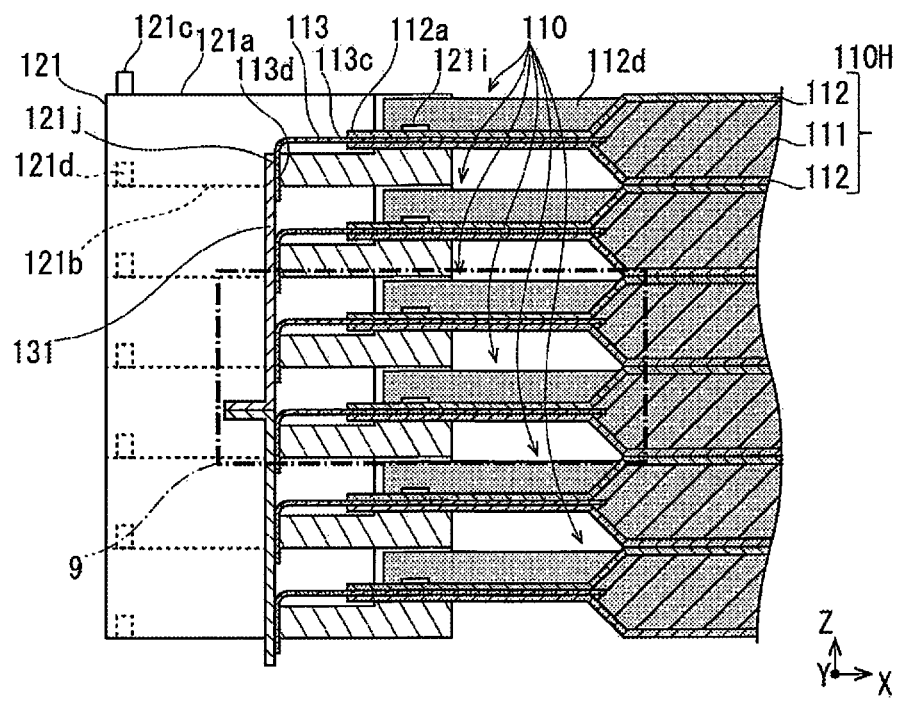
FIG. 8B is a side view illustrating FIG. 8A as viewed from the side.
Figure 9:
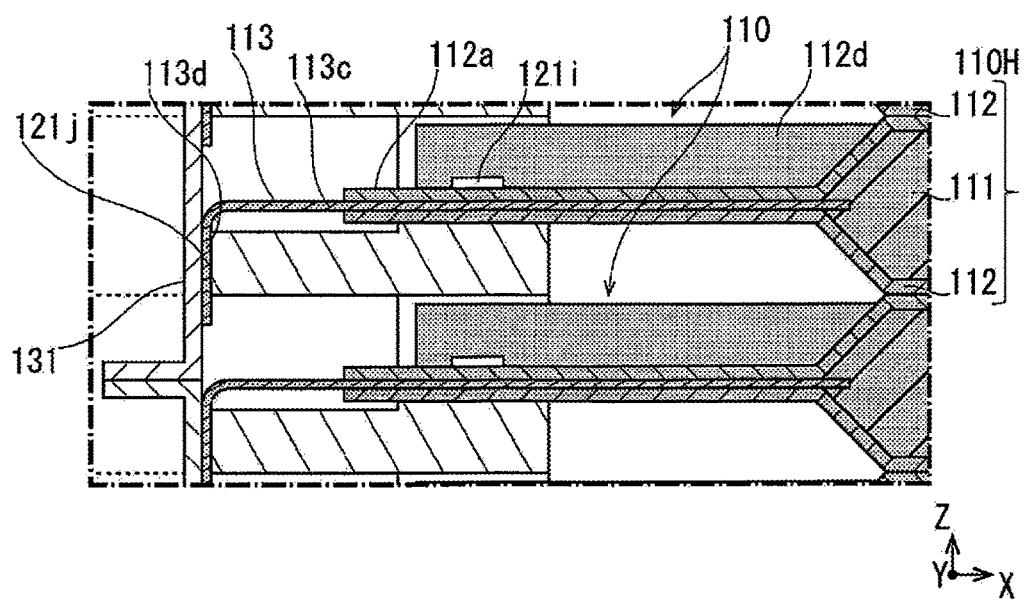
FIG. 9 is an enlarged side view of region 9, as illustrated in FIG. 8B.

FIG. 1 is a perspective view illustrating the battery pack 100 according to the first embodiment. FIG. 2 is a perspective view illustrating a state in which an entire stack body 100S, in a state in which an upper pressure plate 151, a lower pressure plate 152, and left and right side plates 153 are disassembled from the battery pack 100 illustrated in FIG. 1 and a protective cover 140 is attached thereto, is exposed. FIG. 3 is a perspective view illustrating a state in which the protective cover 140 is detached from the stack body 100S illustrated in FIG. 2, and the stack body 100S is disassembled into a cell group 100G and a bus bar unit 130. FIG. 4 is an exploded perspective view illustrating the bus bar unit 130 illustrated in FIG. 3. FIG. 5 is an exploded perspective view schematically illustrating a state in which an anode side electrode tab 113A of a first cell sub-assembly 100M (set of three of the unit cells 110 connected in parallel) and a cathode side electrode tab 113K of a second cell sub-assembly 100N (set of three of the unit cells 110 connected in parallel) are bonded by a bus bar 131. FIG. 6A is a perspective view illustrating a state in which a pair of spacers 120 (first spacer 121 and second spacer 122) are attached to a unit cell 110, and FIG. 6B is a perspective view illustrating a state before the pair of spacers 120 (first spacer 121 and second spacer 122) are attached to the unit cell 110. FIG. 7 is a perspective view illustrating the pair of spacers 120 (first spacer 121 and second spacer 122). FIG. 8A is a perspective view illustrating a cross-section of the principle part of a state in which a bus bar 131 is bonded to the electrode tabs 113 of stack of the unit cells 110, and FIG. 8B is a side view illustrating FIG. 8A as viewed from the side. FIG. 9 is an enlarged side view of region 9, as illustrated in FIG. 8B.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises the stack body 100S including a cell group 100G formed by stacking a plurality of the unit cells 110 having a flat shape in the thickness direction, as illustrated in FIG. 1 and FIG. 2. The battery pack 100 further comprises a protective cover 140 attached on the front side of the stack body 100S, and a chassis 150 that houses the stack body 100S in a state in which each unit cell 110 is pressurized along the stacking direction of the unit cells 110. The stack body 100S comprises the cell group 100G, and the bus bar unit 130 attached to the front side of the cell group 100G and that integrally holds a plurality of the bus bars 131, as illustrated in FIG. 3. The protective cover 140 covers and protects the bus bar unit 130. The bus bar unit 130 comprises a plurality of the bus bars 131 and a bus bar holder 132 that integrally attaches the plurality of the bus bars 131 in a matrix, as illustrated in FIG. 4. Of the plurality of the bus bars 131, an anode side terminal 133 is attached to the terminal end on the anode side, and a cathode side terminal 134 is attached to the terminal end on the cathode side.

The battery pack 100 of the first embodiment generally comprises a cell group 100G and a bus bar 131. The cell group 100G is obtained by stacking, in the thickness direction, a plurality of the unit cells 110 provided with a cell body 110H, which includes a power generation element 111 and which is formed into a flat shape and an electrode tab 113 protruding from the cell body 110H, and the distal end portions 113d of the electrode tabs 113 are bent in the stacking direction Z of the unit cells 110. The bus bar 131 is formed in a flat plate shape and bonded to the distal end portions 113d of the electrode tabs 113 of the unit cells 110 while facing the distal end portions 113d, and electrically connects the electrode tabs 113 of at least two of the unit cells 110 with each other. The battery pack 100 of the first embodiment will be described in detail below.

The cell group 100G is configured by connecting, in series, a first cell sub-assembly 100M comprising three of the unit cells 110 electrically connected in parallel and a second cell sub-assembly 100N comprising three different ones of the unit cells 110 electrically connected in parallel by the bus bars 131, as illustrated in FIG. 5.

The first cell sub-assembly 100M and the second cell sub-assembly 100N have the same configuration, excluding the bent directions of the distal end portions 113d of the electrode tabs 113 of the unit cells 110. Specifically, the second cell sub-assembly 100N is one in which the top and bottom of the unit cells 110 included in the first cell sub-assembly 100M are reversed. However, the bent direction of the distal end portions 113d of the electrode tabs 113 of the second cell sub-assembly 100N is aligned on the lower side of the stacking direction Z so as to be the same as the bent direction of the distal end portions 113d of the electrode tabs 113 of the first cell sub-assembly 100M. A pair of spacers 120 (a first spacer 121 and a second spacer 122) are attached to each of the unit cells 110.

The unit cell 110 corresponds to, for example, a flat lithium ion secondary battery. The unit cell 110 comprises a cell body 110H obtained by sealing a power generation element 111 with a pair of laminate films 112 and a thin plate shaped electrode tab 113 that is electrically connected to the power generation element 111 and protruding from the cell body 110H to the outside, as illustrated in FIG. 6 and FIG. 8.

The power generation element 111 is formed by laminating a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of laminate films 112 cover the power generation element 111 from both sides along the stacking direction Z to seal the four sides thereof. In the pair of laminate films 112, an anode side electrode tab 113A and a cathode side electrode tab 113K protrude out from between an end portion 112a along the short side direction Y to the outside, as illustrated in FIG. 6.

In the laminate film 112, a pair of connecting pins 121i of the first spacer 121 are respectively inserted into a pair of connecting holes 112e respectively provided on both ends of the end portion 112a along the short side direction Y, as illustrated in FIG. 6 and FIG. 7. On the other hand, in the laminate film 112, a pair of connecting pins 121i are respectively inserted into a pair of connecting holes 112e respectively provided on both ends of the other end portion 112b along the short side direction Y. In the laminate film 112, two end portions 112c and 112d along the longitudinal direction X are formed bent upward in the stacking direction Z. In the laminate film 112, the two end portions 112c and 112d along the longitudinal direction X may be formed bent downward in the stacking direction Z.

The electrode tab 113 is configured from an anode side electrode tab 113A and a cathode side electrode tab 113K, which respectively extend from between the end portion 112a of a pair of laminate films 112 toward the outside, in a state of being separated from each other, as illustrated in FIGS. 6, 8, and 9. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape from a proximal end portion 113c adjacent to the cell body 110H to the distal end portion 113d, as illustrated in FIG. 8 and FIG. 9. Specifically, the electrode tab 113 extends from the proximal end portion 113c thereof along one side in the longitudinal direction X. On the other hand, the distal end portion 113d of the electrode tab 113 is formed folded downward along the stacking direction Z. The shape of the distal end portion 113d of the electrode tab 113 is not limited to an L shape. The distal end portion 113d of the electrode tab 113 is formed in a planar shape so as to face the bus bar 131. The electrode tab 113 may be formed in a U shape by further extending the distal end portion 113d and folding by the extended portion along the proximal end portion 113c on the cell body 110H side. On the other hand, the proximal end portion 113c of the electrode tab 113 may be formed in a wave shape or a curved shape.

In the plurality of the unit cells 110, the distal end portion 113d of each electrode tab 113 is aligned and folded downward in the stacking direction Z, as illustrated in FIG. 5 and FIG. 8. Here, in the battery pack 100, three of the unit cells 110 electrically connected in parallel (first cell sub-assembly 100M) and three different ones of the unit cells 110 electrically connected in parallel (second cell sub-assembly 100N) are connected in series, as illustrated in FIG. 5. Therefore, the top and bottom of the unit cells 110 are interchanged every three of the unit cells 110, such that the positions of the anode side electrode tabs 113A and the cathode side electrode tabs 113K of the unit cells 110 crisscross along the stacking direction Z.

However, if the top and bottom are simply interchanged every three of the unit cells 110, the positions of the distal end portions 113d of the electrode tabs 113 will differ in the vertical direction along the stacking direction Z; therefore, all of the distal end portions 113d of the electrode tabs 113 of the unit cells 110 are adjusted and folded so that the positions thereof will be aligned.

In the first cell sub-assembly 100M illustrated in the lower part of FIG. 5, the anode side electrode tab 113A is disposed on the right side of the drawing, and the cathode side electrode tab 113K is disposed on the left side of the drawing. On the other hand, in the second cell sub-assembly 100N illustrated in the upper part of FIG. 5, the cathode side electrode tab 113K is disposed on the right side of the drawing, and the anode side electrode tab 113A is disposed on the left side of the drawing.

In this manner, even if the arrangement of the anode side electrode tab 113A and the cathode side electrode tab 113K is different, the distal end portion 113d of the electrode tab 113 of the unit cell 110 is folded downward along the stacking direction Z. In addition, the distal end portions 113d of the electrode tabs 113 are arranged on the same side of the stack body 100S, as illustrated in FIG. 3. A double-sided tape 160 that is bonded with a lamination member to be stacked above is adhered to the unit cells 110 positioned on the upper surfaces of the first cell sub-assembly 100M and the second cell sub-assembly 100N.

A pair of spacers 120 (first spacer 121 and second spacer 122) are disposed between the stack of the unit cells 110, as illustrated in FIGS. 3, 5, and 8. The first spacer 121 is disposed along one end portion 112a of the laminate film 112 where the electrode tab 113 of the unit cell 110 protrudes, as illustrated in FIG. 6. The second spacer 122 is disposed along the other end portion 112b of the laminate film 112, as illustrated in FIG. 6. The second spacer 122 has a configuration in which the shape of the first spacer 121 is simplified. A plurality of the unit cells 110 are stacked in the stacking direction Z, after attaching a pair of spacers 120 (first spacer 121 and second spacer 122) to each. The pair of spacers 120 (first spacer 121 and second spacer 122) are made of reinforced plastics having insulating properties. Below, after describing the configuration of the first spacer 121, the configuration of the second spacer 122 will be described while comparing it with the configuration of the first spacer 121.

The first spacer 121 is formed in a rectangular parallelepiped shape, elongated along the short side direction Y, as illustrated in FIG. 6 and FIG. 7. The first spacer 121 is provided with placing portions 121M and 121N on the two ends in the longitudinal direction thereof (short side direction Y).

When the first spacer 121 is stacked in a state of being attached to a unit cell 110, the upper surfaces 121a of the placing portions 121M and 121N of one first spacer 121, and the lower surfaces 121b of the placing portions 121M and 121N of another first spacer 121 disposed above the first spacer 121, come in contact, as illustrated in FIG. 8B.

In the first spacer 121, in order to relatively position the plurality of the unit cells 110 to be stacked, a positioning pin 121c provided on the upper surface 121a of one first spacer 121 is fitted with a positioning hole 121d that is opened on the lower surface 121b of another first spacer 121 and that corresponds to the position of the positioning pin 121c, as illustrated in FIG. 7 and FIG. 8B.

In the first spacer 121, a locating hole 121e for inserting a bolt that connects a plurality of assembled batteries 100 to each other along the stacking direction Z is opened in each of the placing portions 121M and 121N along the stacking direction Z, as illustrated in FIG. 7.

The first spacer 121 is formed such that the region between the placing portions 121M and 121N is notched from the upper side of the stacking direction Z, as illustrated in FIG. 6B and FIG. 7. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the one end portion 112a of the laminate film 112, in which the electrode tab 113 is protruded, with the first supporting surface 121g, as illustrated in FIG. 6. The first spacer 121 is provided with a pair of connecting pins 121i protruding upward from both ends of the first supporting surface 121g.

The first spacer 121 is provided with a supporting portion 121j, which abuts the electrode tab 113 from the opposite side of the bus bar 131 and supports the distal end portion 113d of the electrode tab 113 of the unit cell 110, on the side surface adjacent to the second supporting surface 121h along the stacking direction Z, as illustrated in FIG. 8 and FIG. 9. The supporting portion 121j of the first spacer 121 sandwiches the distal end portion 113d of the electrode tab 113 together with the bus bar 131 such that the distal end portion 113d and the bus bar 131 are sufficiently abutting each other.

The second spacer 122 has a configuration in which the shape of the first spacer 121 is simplified, as illustrated in FIG. 6 and FIG. 7. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with a supporting surface 122k. Specifically, the second spacer 122 is provided with placing portions 122M and 122N, in the same manner as the first spacer 121. The second spacer 122 is provided with the supporting surface 122k in the portion where the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with bus bars 131, as illustrated in FIG. 3 and FIG. 4. The bus bar 131 is made of a metal having electrical conductivity, and electrically connects the distal end portions 113d of the electrode tabs 113 of different unit cells 110 to each other. The bus bar 131 is formed in a flat plate shape, and is erected along the stacking direction Z.

The bus bar 131 is integrally formed by bonding an anode side bus bar 131A that is laser-welded with an anode side electrode tab 113A of one unit cell 110, and a cathode side bus bar 131K that is laser-welded with a cathode side electrode tab 113K of another unit cell 110 adjacent along the stacking direction Z.

The anode side bus bar 131A and the cathode side bus bar 131K have the same shape and are respectively formed in an L shape, as illustrated in FIG. 4 and FIG. 8. The anode side bus bar 131A and the cathode side bus bar 131K are superimposed with the top and bottom inverted. Specifically, the bus bar 131 is integrated by bonding the folded portion of the end portion of the anode side bus bar 131A along the stacking direction Z, and the folded portion of the end portion of the cathode side bus bar 131K along the stacking direction Z. The anode side bus bar 131A and the cathode side bus bar 131K are provided with side portions 131c at one end in the short side direction Y along the longitudinal direction X, as illustrated in FIG. 4. The side portions 131c are bonded to the bus bar holder 132.

The anode side bus bar 131A is made of aluminum, in the same manner as the anode side electrode tab 113A. The cathode side bus bar 131K is made of copper, in the same manner as the cathode side electrode tab 113K. The anode side bus bar 131A and the cathode side bus bar 131K made of different metals are bonded to each other by ultrasonic bonding.

For example, if the battery pack 100 is configured by connecting, in series, a plurality of sets of three of the unit cells 110 connected in parallel, as illustrated in FIG. 5, the anode side bus bar 131A portion of the bus bar 131 is laser-welded with the anode side electrode tabs 113A of three of the unit cells 110 that are adjacent to each other along the stacking direction Z. In the same manner, the cathode side bus bar 131K portion of the bus bar 131 is laser-welded with the cathode side electrode tabs 113K of three of the unit cells 110 that are adjacent to each other along the stacking direction Z.

However, of the bus bars 131 arranged in a matrix shape, the bus bar 131 positioned on the upper right in the drawing in FIG. 3 and FIG. 4 corresponds to the anode side terminal ends of 21 of the unit cells 110 (3 parallel 7 series), and is configured from an anode side bus bar 131A only. This anode side bus bar 131A is laser-welded with the anode side electrode tabs 113A of the three uppermost unit cells 110 of the cell group 100G. In the same manner, of the bus bars 131 arranged in a matrix shape, the bus bar 131 positioned on the lower left in the drawing in FIG. 3 and FIG. 4 corresponds to the cathode side terminal ends of 21 of the unit cells 110 (3 parallel 7 series), and is configured from a cathode side bus bar 131K only. This cathode side bus bar 131K is laser-welded with the cathode side electrode tabs 113K of the three lowermost unit cells 110 of the cell group 100G.

The bus bar holder 132 integrally holds a plurality of the bus bars 131 in a matrix so as to face the electrode tab 113 of each of a plurality of the unit cells 110, as illustrated in FIG. 3. The bus bar holder 132 is made of resin having insulating properties, and is formed in a frame shape.

The bus bar holder 132 is respectively provided with a pair of columnar support portions 132a erected along the stacking direction Z, so as to be positioned on both sides of the longitudinal direction of the first spacers 121 that support the electrode tabs 113 of the unit cells 110, as illustrated in FIG. 4. The pair of columnar support portions 132a are fitted to the side surfaces of the placing portions 121M and 121N of the first spacer 121. The pair of columnar support portions 132a have an L shape when viewed along the stacking direction Z, and are formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b are formed in a plate shape extended along the stacking direction Z.

The bus bar holder 132 comprises insulating portions 132c that respectively protrude between adjacent bus bars 131 along the stacking direction Z, as illustrated in FIG. 4. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between the bus bars 131 of the unit cells 110 that are adjacent to each other along the stacking direction Z.

The bus bar holder 132 may be configured by bonding the columnar support portion 132a, the auxiliary columnar support portion 132b, and the insulating portion 132c, which are independently formed, or be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 3 and FIG. 4.

The anode side terminal 133 is bonded to the anode side bus bar 131A positioned on the upper right in the drawing, from among the bus bars 131 arranged in a matrix, as illustrated in FIG. 3 and FIG. 4. The anode side terminal 133 is made of a metal plate having electrical conductivity, and, when viewed along the short side direction Y, has a shape in which one end portion 133b and the other end portion 133c are folded in different directions along the stacking direction Z with reference to the central portion 133a. The end portion 133b is laser-welded to the anode side bus bar 131A. An external input/output terminal is connected to a hole 133d (including the screw groove) opened in the center of the other end portion 133c.

The cathode side terminal 134 corresponds to the cathode side terminal end of the cell group 100G configured by alternately stacking the first cell sub-assembly 100M and the second cell sub-assembly 100N, as illustrated in FIG. 3 and FIG. 4. The cathode side terminal 134 is bonded to the cathode side bus bar 131K positioned on the lower left in the drawing, from among the bus bars 131 arranged in a matrix, as illustrated in FIG. 3 and FIG. 4. The cathode side terminal 134 is configured in the same manner as the anode side terminal 133.

The protective cover 140 prevents the bus bars 131 from short-circuiting with each other and the bus bars 131 from coming in contact with an external member and being short-circuited or causing electric leakage by covering the bus bar unit 130, as illustrated in FIGS. 1-3. Furthermore, the protective cover 140 exposes the anode side terminal 133 and the cathode side terminal 134 to the outside and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 3. The protective cover 140 has a shape in which the upper end 140b and the lower end 140c of the side surface 140a thereof are bent in the longitudinal direction X, and is fitted to the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 2 and FIG. 3. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1 and FIG. 2. An appropriate surface pressure is imparted to the power generation element 111 by sandwiching and pressurizing the power generation element 111 of each unit cell 110 provided on the cell group 100G with the upper pressure plate 151 and the lower pressure plate 152.

The upper pressure plate 151 is disposed above the cell group 100G along the stacking direction Z, as illustrated in FIG. 1 and FIG. 2. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121, or the placing portions 122M and 122N of the second spacer 122. A locating hole 151c, which communicates with the positioning hole 121d of the first spacer 121 or the positioning hole 122d of the second spacer 122 along the stacking direction Z, is opened in the center of the holding portion 151b. A bolt that connects assembled batteries 100 with each other is inserted into the locating hole 151c. The upper pressure plate 151 is made of a metal plate having a sufficient thickness.

The lower pressure plate 152 has the same configuration as the upper pressure plate 151, and is formed by reversing the top and bottom of the upper pressure plate 151, as illustrated in FIG. 1 and FIG. 2. The lower pressure plate 152 is disposed below the cell group 100G along the stacking direction Z. The lower pressure plate 152 presses the power generation element 111 of each unit cell 110 upward with the pressing surface 151a protruding upward along the stacking direction Z.

One pair of side plates 153 fix the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1 and FIG. 2. The side plate 153 is made of a rectangular metal plate and is erected along the stacking direction Z. One pair of side plates 153 are bonded to the upper pressure plate 151 and the lower pressure plate 152 from both sides in the short side direction Y of the cell group 100G by laser welding. Each side plate 153 is subjected to seam welding or spot welding at the upper end 153a portion that abuts the upper pressure plate 151 along the longitudinal direction X. In the same manner, each side plate 153 is subjected to seam welding or spot welding at the lower end 153b portion that abuts the lower pressure plate 152 along the longitudinal direction X. The pair of side plates 153 cover and protect both sides of the cell group 100G in the short side direction Y.

Next, the manufacturing method of the battery pack 100 will be described, with reference to FIGS. 10-17.

The manufacturing method (manufacturing steps) of the battery pack 100 comprises a stacking step (FIG. 10) for stacking the members configuring the battery pack 100, a pressurizing step (FIG. 11) for pressurizing the cell group 100G of the battery pack 100, a first bonding step (FIG. 12) for bonding the side plates 153 to the upper pressure plate 151 and the lower pressure plate 152, a second bonding step (FIGS. 13-16) for bonding the bus bar 131 with the electrode tab 113 of the unit cell 110, and bonding the terminal to the bus bar 131, and a mounting step (FIG. 17) for attaching the protective cover 140 to the bus bar 131.

The stacking step for stacking the members configuring the battery pack 100 will be described, with reference to FIG. 10.

Figure 10:
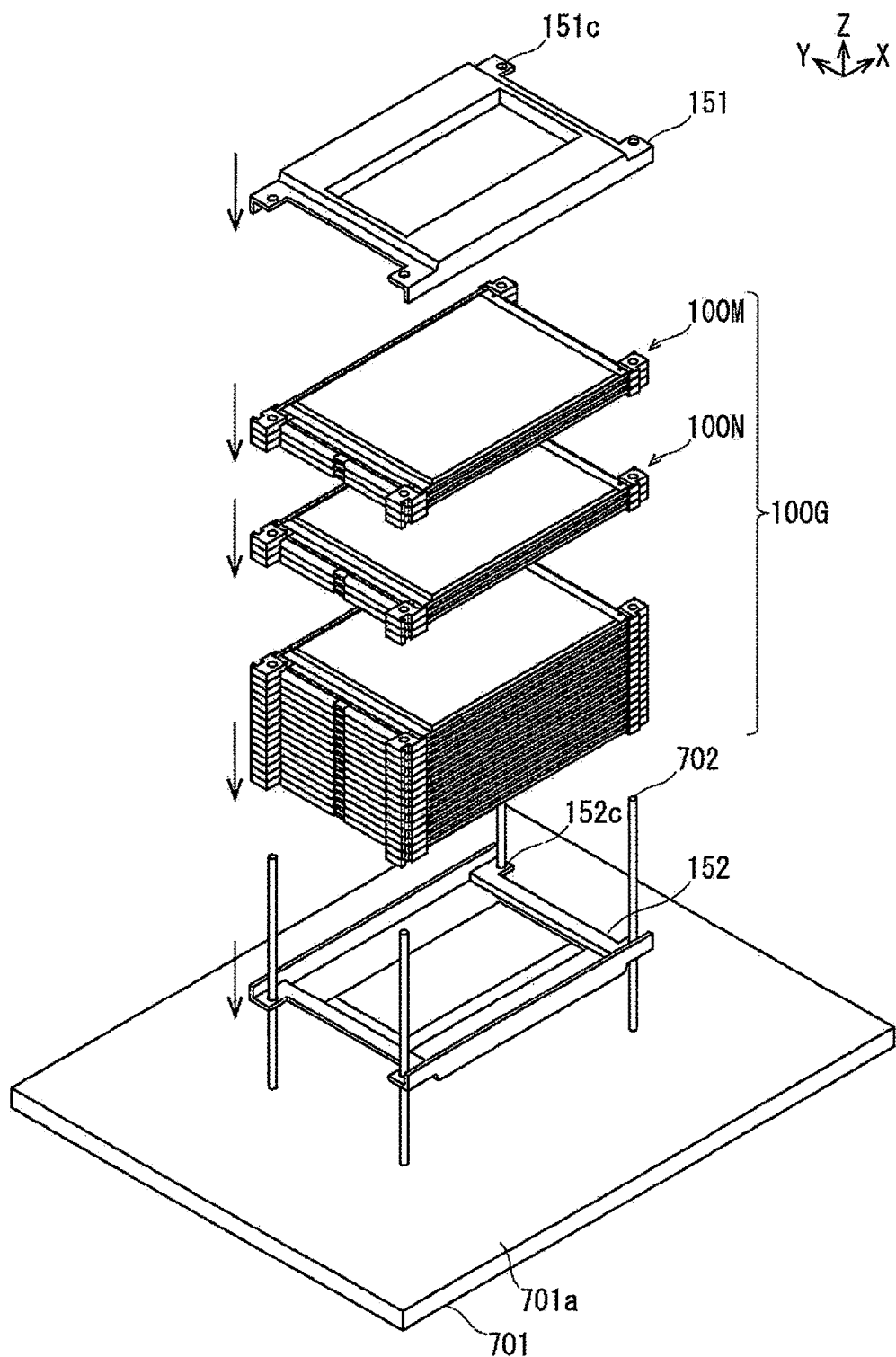
FIG. 10 is a view illustrating the battery pack manufacturing method according to the first embodiment, and a perspective view schematically illustrating a state in which members constituting a battery pack are sequentially stacked on a mounting table.

FIG. 10 is a view illustrating the battery pack 100 manufacturing method according to the first embodiment, and a perspective view schematically illustrating a state in which members constituting the battery pack 100 are sequentially stacked on a mounting table 701.

The mounting table 701 used for the stacking step is formed in a plate shape and is provided along a horizontal plane. The mounting table 701 comprises locating pins 702 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 702 are erected on the upper surface 701a of the mounting table 701 with predetermined intervals therebetween. The intervals between the four locating pins 702 from each other correspond, for example, to the intervals between the locating holes 152c provided on the four corners of the upper pressure plate 151. The members constituting the battery pack 100 are stacked using a robot arm, a hand lifter, a vacuum adsorption type collet, or the like.

In the stacking step, the lower pressure plate 152 is lowered along the stacking direction Z and mounted on the upper surface 701a of the mounting table 701, in a state in which the locating holes 152c provided on the four corners thereof are inserted into the locating pins 702 by a robot arm, as illustrated in FIG. 10. Next, the first cell sub-assembly 100M is lowered along the stacking direction Z and mounted on the lower pressure plate 152, in a state in which the locating holes provided on the first spacer 121 and the second spacer 122, which are component members thereof, are inserted into the locating pins 702 by a robot arm. In the same manner, three sets each of the second cell sub-assembly 100N and the first cell sub-assembly 100M are alternately stacked by the robot arm. A double-sided tape 160 that is bonded with a lamination member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151c provided on the four corners thereof are inserted into the locating pins 702 by a robot arm.

The pressurizing step for pressurizing the cell group 100G of the battery pack 100 will be described with reference to FIG. 11.

Figure 11:
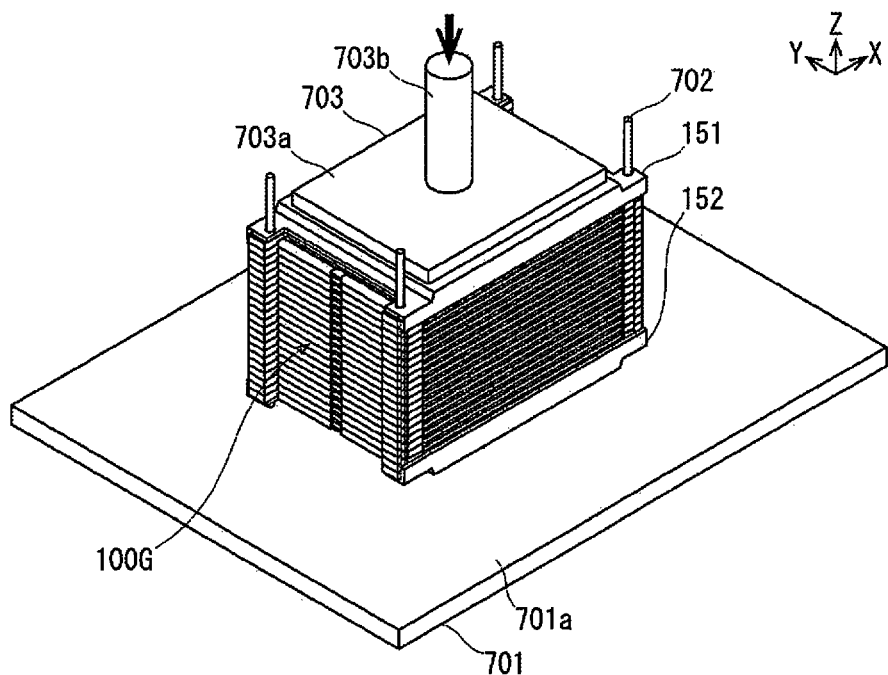
FIG. 11 is a perspective view schematically illustrating a state in which the component members of a battery pack are pressed from above, following FIG. 10.

FIG. 11 is a perspective view schematically illustrating a state in which the component members of a battery pack 100 are pressed from above, following FIG. 10.

A pressurizing jig 703 as used in the pressurizing step comprises a pressurizing portion 703a that is formed in a plate shape and provided along a horizontal plane, and a supporting portion 703b that is formed in a cylindrical shape and that is erected and bonded on the upper surface of the pressurizing portion 703a. The supporting portion 703b connects a hydraulic cylinder and an electric stage that are driven along the stacking direction Z. The pressurizing portion 703a move above and below along the stacking direction Z via the supporting portion 703b. The pressurizing portion 703a pressurizes the abutted lamination members.

In the pressurizing step, the pressurizing portion 703a of the pressurizing jig 703 is lowered downward along the stacking direction Z while being abutted against the upper pressure plate 151 by the electric stage connected to the supporting portion 703b being driven, as illustrated in FIG. 11. The cell group 100G is sandwiched and pressurized by the upper pressure plate 151 that is pressed downward and the lower pressure plate 152 that is mounted on the mounting table 701. An appropriate surface pressure is imparted to the power generation element 111 of each unit cell 110 provided on the cell group 100G. The pressurizing step is continued until the first bonding step is completed.

The first bonding step in which the side plates 153 are bonded to the upper pressure plate 151 and the lower pressure plate 152 will be described with reference to FIG. 12.

Figure 12:
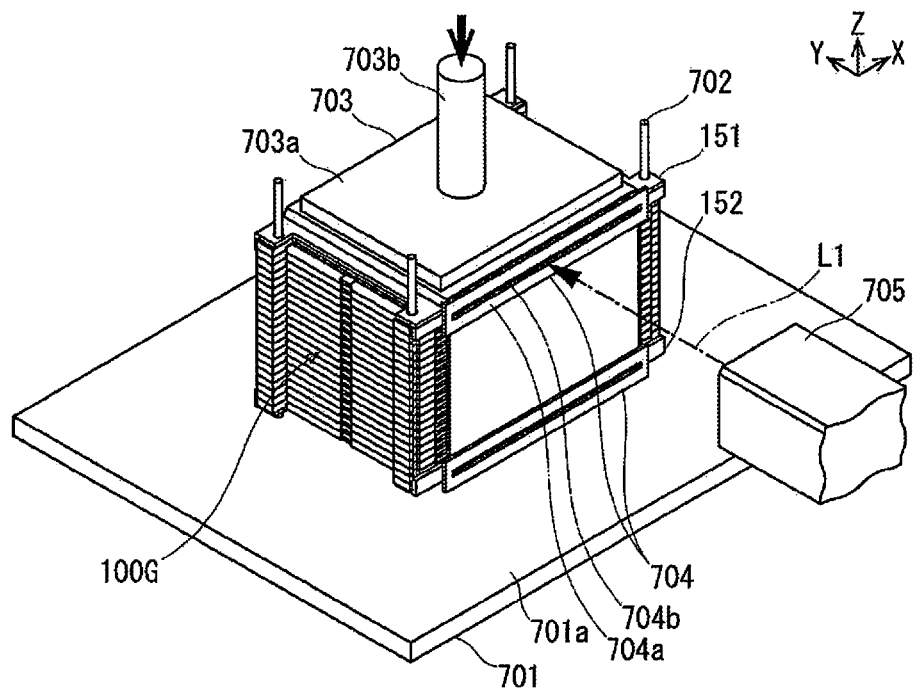
FIG. 12 is a perspective view schematically illustrating a state in which a side plate is laser-welded to an upper pressure plate and a lower pressure plate, following FIG. 11.

FIG. 12 is a perspective view schematically illustrating a state in which the side plates 153 are laser-welded to the upper pressure plate 151 and the lower pressure plate 152, following FIG. 11.

A pushing plate 704 as used in the first bonding step respectively presses the side plates 153 to the upper pressure plate 151 and the lower pressure plate 152, to respectively bring the side plates 153 in close contact with the upper pressure plate 151 and the lower pressure plate 152. The pushing plate 704 is made of metal and formed in an elongated plate shape. A linear slit 704b is opened in a main body 704a of the pushing plate 704 along the longitudinal direction. The short side direction of the pushing plate 704 is erected along the stacking direction Z. The pushing plate 704 presses the side plate 153 with the main body 704a, and allows laser light L1 for welding to pass along the slit 704b.

A laser oscillator 705 is a light source used for bonding the side plates 153 to the upper pressure plate 151 and the lower pressure plate 152. The laser oscillator 705 is configured from, for example, a YAG (yttrium aluminum garnet) laser. The laser light L1 that is led out from the laser oscillator 705 is irradiated to the upper end 153a and the lower end 153b of the side plate 153, in a state in which the light path is adjusted by, for example, an optical fiber or a mirror, and condensed by a condenser lens. The laser light L1 that is led out from the laser oscillator 705 may be split by a half-mirror and irradiated to the upper end 153a and the lower end 153b of the side plate 153 at the same time.

In the first bonding step, a laser oscillator 705 horizontally scans laser light L1 on the upper end 153a of the side plate 153 that is pressed by the pushing plate 704 via the slit 704b of the pushing plate 704, and subjects the side plate 153 and the upper pressure plate 151 to seam welding at a plurality of locations, as illustrated in FIG. 12. In the same manner, the laser oscillator 705 horizontally scans laser light L1 on the lower end 153b of the side plate 153 that is pressed by the pushing plate 704 via the slit 704b of the pushing plate 704, and subjects the side plate 153 and the lower pressure plate 152 to seam welding at a plurality of locations.

The second bonding step in which the bus bar 131 is bonded to the electrode tabs 113 of the unit cell 110 and the terminal is bonded to the bus bar 131 will be described with reference to FIGS. 13-16.

Figure 13:
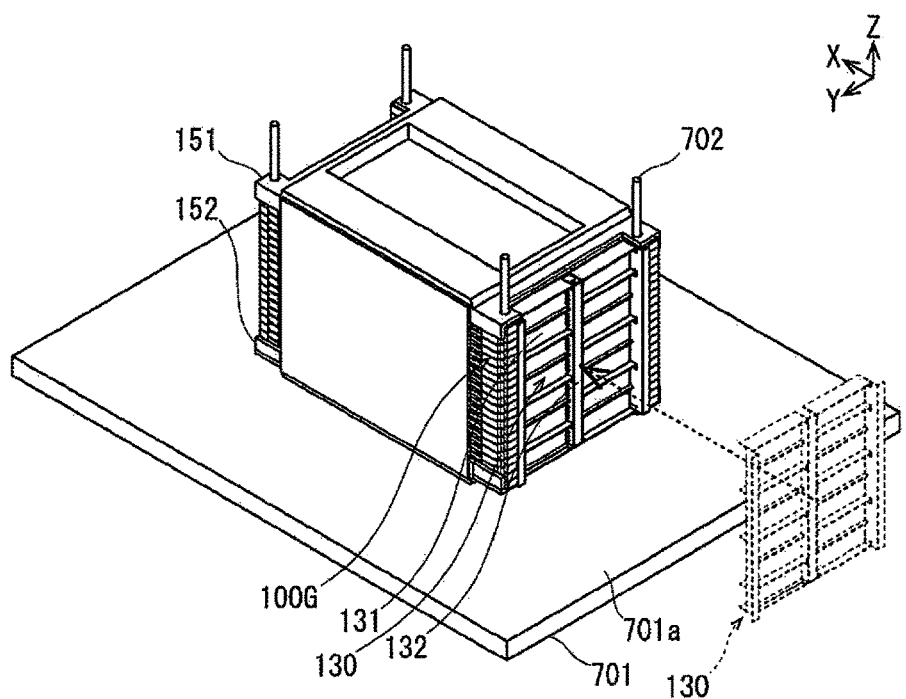
FIG. 13 is a perspective view schematically illustrating a state in which a part of the members of the bus bar unit is attached to the cell group, following FIG. 12.
Figure 14:
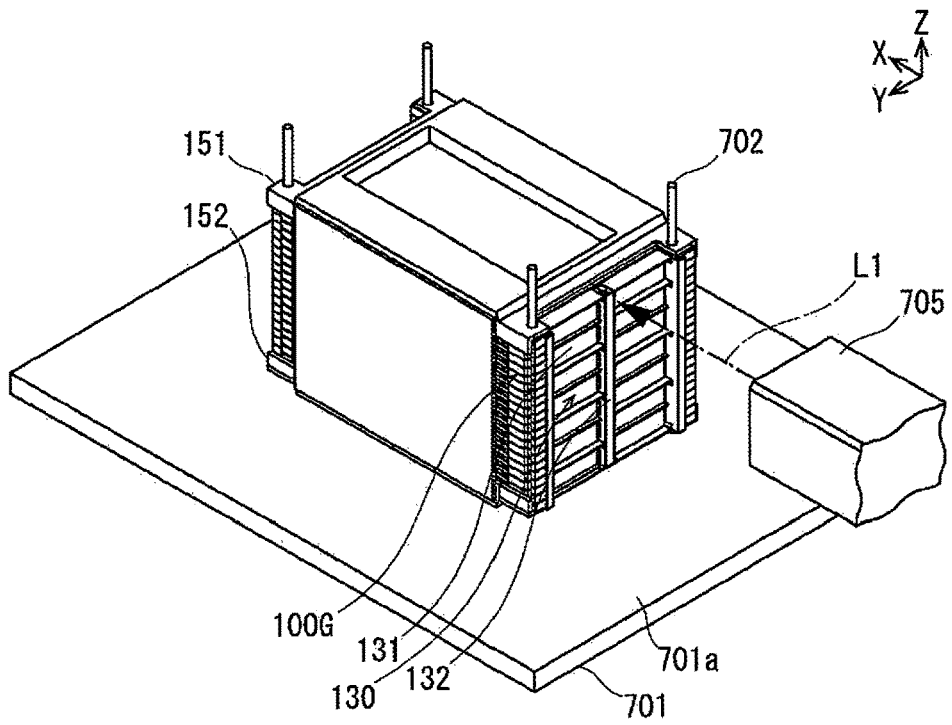
FIG. 14 is a perspective view schematically illustrating a state in which the bus bar of the bus bar unit is laser-welded to the electrode tabs of the unit cell, following FIG. 13.
Figure 15:
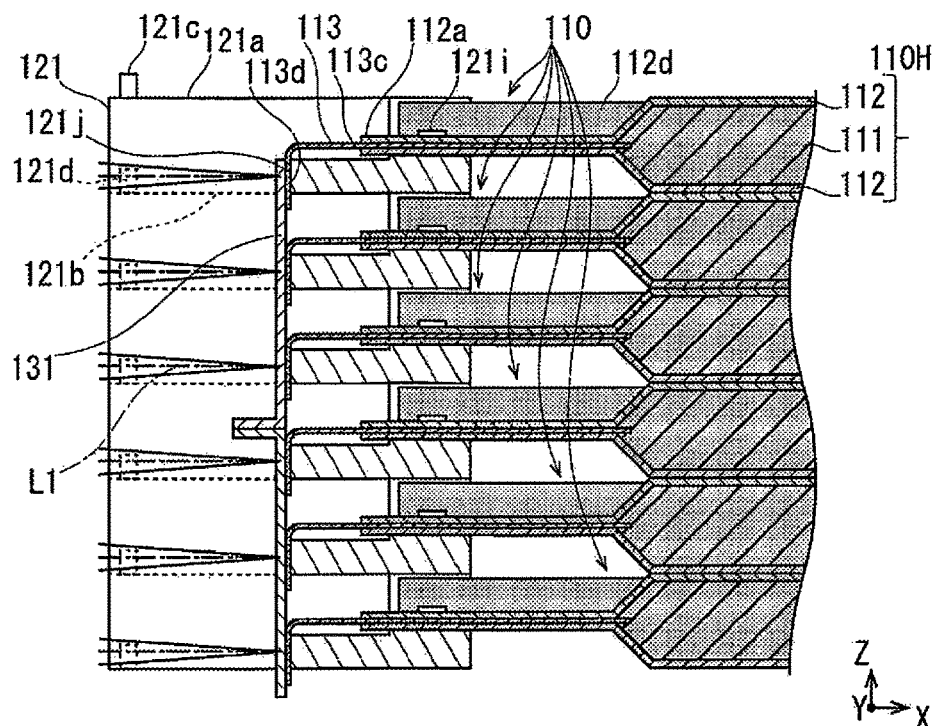
FIG. 15 is a side view illustrating a cross-section of the principle part of a state in which the bus bar is laser-welded to the electrode tabs of the stack of the unit cells.
Figure 16:
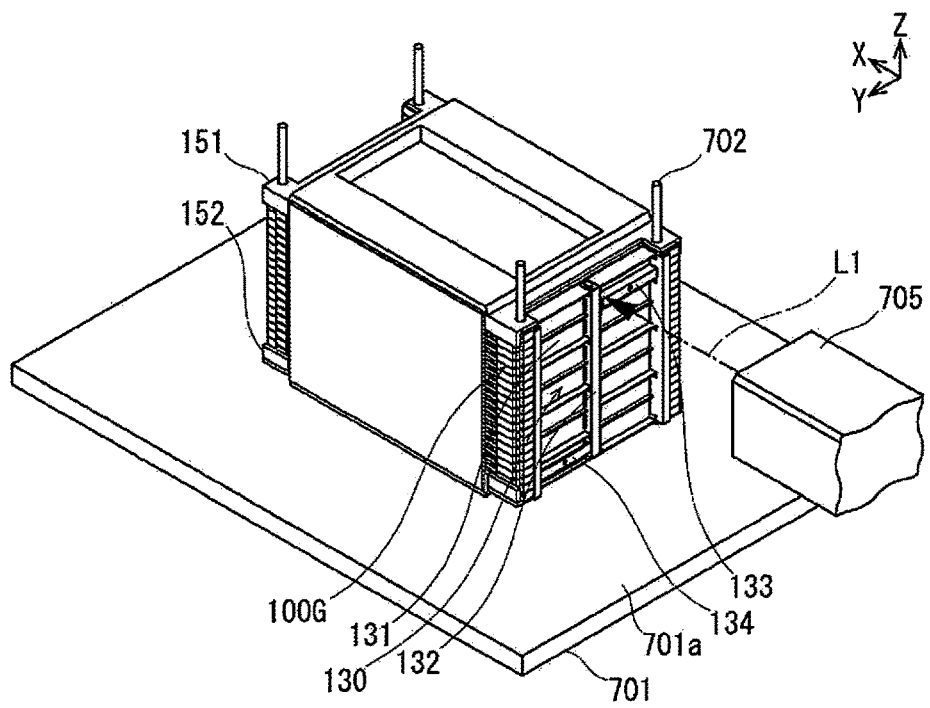
FIG. 16 is a perspective view schematically illustrating a state in which an anode side terminal and a cathode side terminal are laser-welded to an anode side bus bar and a cathode side bus bar, following FIG. 14 and FIG. 15.

FIG. 13 is a perspective view schematically illustrating a state in which a part of the members of the bus bar unit 130 is attached to the cell group 100G, following FIG. 12. FIG. 14 is a perspective view schematically illustrating a state in which the bus bar 131 of the bus bar unit 130 is laser-welded to the electrode tabs 113 of the unit cell 110, following FIG. 13. FIG. 15 is a side view illustrating a cross-section of the principle part of a state in which the bus bar 131 is laser-welded to the electrode tabs 113 of the stack of the unit cells 110. FIG. 16 is a perspective view schematically illustrating a state in which an anode side terminal 133 and a cathode side terminal 134 are laser-welded to an anode side bus bar 131A and a cathode side bus bar 131K, following FIG. 14 and FIG. 15.

In the second bonding step, the mounting table 701 rotates 90 degrees counterclockwise as shown in the drawing to cause the electrode tabs 113 of the cell group 100G and the laser oscillator 705 to face each other, as illustrated in FIG. 12 and FIG. 13. Furthermore, the bus bar holder 132, by which the bus bars 131 are integrally held, is kept pressed while being abutted on the corresponding electrode tabs 113 of the cell group 100G by a robot arm. Furthermore, the laser oscillator 705 irradiates the laser light L1 to the bus bar 131, and bonds the bus bar 131 and the distal end portions 113d of the electrode tabs 113 by seam welding or spot welding, as illustrated in FIG. 14 and FIG. 15. Then, the anode side terminal 133 is bonded to the anode side bus bar 131A corresponding to the anode side terminal end (upper right in FIG. 4), from among the bus bars 131 arranged in a matrix, as illustrated in FIG. 16. In the same manner, the cathode side terminal 134 is bonded to the cathode side bus bar 131K corresponding to the cathode side terminal end (lower left in FIG. 4), from among the bus bars 131 arranged in a matrix.

The mounting step in which a protective cover 140 is attached to the bus bar 131 will be described, with reference to FIG. 17.

Figure 17:
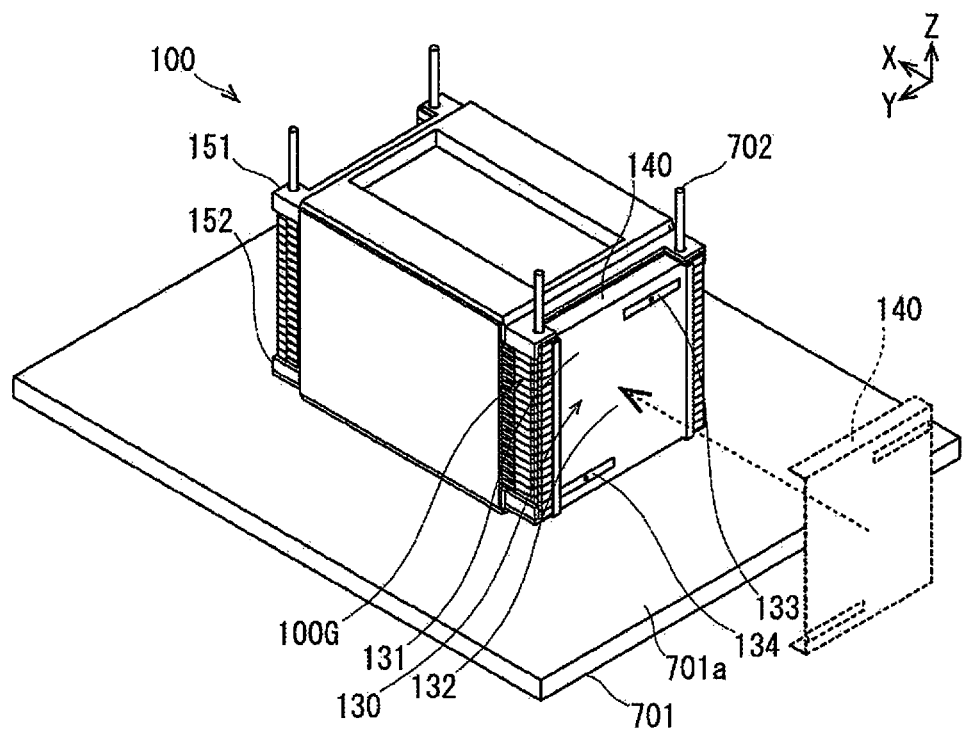
FIG. 17 is a perspective view schematically illustrating a state in which a protective cover is attached to the bus bar unit, following FIG. 16.

FIG. 17 is a perspective view schematically illustrating a state in which a protective cover 140 is attached to the bus bar unit 130, following FIG. 16.

In the mounting step, a protective cover 140 is attached to the bus bar unit 130 while fitting the upper end 140b and the lower end 140c of the protective cover 140 to the bus bar unit 130, using the robot arm. The upper end 140b and the lower end 140c of the protective cover 140 may be bonded to the bus bar unit 130 by an adhesive. The protective cover 140 exposes the anode side terminal 133 to the outside from the first opening 140d, and exposes the cathode side terminal 134 from the second opening 140e. The protective cover 140 covers the bus bar unit 130 to prevent the bus bars 131 from short-circuiting with each other and the bus bars 131 from coming in contact with an external member and being short-circuited or causing electrical leakage. When manufacture is completed, the battery pack 100 is removed from the mounting table 701 and carried out to an inspection step for inspecting the battery performance, and the like.

The manufacturing method of the battery pack 100 described with reference to FIGS. 10-17 may be embodied by an automatic machine in which all of the steps are controlled by a controller, a semiautomatic machine in which a portion of the steps are carried out by a worker, or a manual machine in which all of the steps are carried out by a worker.

According to the battery pack 100 and the battery pack 100 manufacturing method according to the first embodiment described above, the following action and effects are achieved.

The battery pack 100 comprises a cell group 100G and a bus bar 131. The cell group 100G is obtained by stacking, in the thickness direction, a plurality of the unit cells 110 provided with a cell body 110H, which includes a power generation element 111 and which is formed into a flat shape, and an electrode tab 113 protruding from the cell body 110H, and the distal end portions 113d of the electrode tabs 113 are bent in the stacking direction Z of the unit cells 110. The bus bar 131 is formed in a flat plate shape and bonded to the distal end portions 113d of the electrode tabs 113 of the unit cells 110 while facing the distal end portions 113d, and electrically connects the electrode tabs 113 of at least two of the unit cells 110 with each other.

The manufacturing method of the battery pack 100 is a manufacturing method in which a unit cell 110 provided with a cell body 110H, which includes a power generation element 111 and which is formed into a flat shape, and an electrode tab 113 protruding from the cell body 110H and the distal end portion 113d of which is bent in the thickness direction of the cell body 110H, and a flat plate shaped bus bar 131 that electrically connects the distal end portions 113d of the unit cells 110 are bonded. In this battery pack 100 manufacturing method, the bus bar 131, and each of the distal end portions 113d of the electrode tabs 113 of at least two of the plurality of the unit cells 110 that are stacked along the thickness direction, are brought into contact while facing each other and welded.

According to the battery pack 100 and the manufacturing method of the battery pack 100 configured in this manner, a flat plate shaped bus bar 131 is disposed so as to face the distal end portion 113d of each electrode tab 113 bent in the stacking direction Z. In this manner, it is possible to cause each of the electrode tabs 113 and bus bars 131 to be sufficiently brought into contact, even if the relative position of each electrode tab 113 and bus bar 131 is shifted in the stacking direction Z, due to variation in the thickness of the unit cells 110. Therefore, according to the battery pack 100 and the battery pack 100 manufacturing method, it is possible to obtain sufficient conduction between the electrode tabs 113 and the bus bars 131 of each unit cell 110, without depending on variation in the thickness of each unit cell 110.

The electrode tab 113 is formed by being bent in an L shape from a proximal end portion 113c adjacent to the cell body 110H to the distal end portion 113d in plan view as seen from the side of the unit cell 110, and is made by mutually bonding the portion where the flat portion of the distal end portion 113d and the bus bar 131 are superposed.

According to such a configuration, the distal end portions 113d of the electrode tabs 113 and the bus bars 131 can be arranged along the stacking direction Z, using an extremely simple shape in which the electrode tab 113 is formed in an L shape. Therefore, the battery pack 100 can obtain the desired electrical characteristics by sufficiently conducting the electrode tabs 113 and the bus bars 131 of each unit cell 110, using an electrode tab 113 that can be formed inexpensively.

Furthermore, the cell group 100G comprises spacers (first spacer 121) that are disposed between the electrode tabs 113 of the stack of the unit cells 110. The first spacer 121 is provided with a supporting portion 121j, which abuts the electrode tab 113 from the opposite side of the bus bar 131 and supports the distal end portion 113d of the electrode tab 113.

According to such a configuration, the distal end portion 113d of the electrode tab 113 can be brought into close contact with the bus bar 131 by the supporting portion 121j of the first spacer 121. Therefore, it is possible to obtain sufficient conduction between the electrode tabs 113 and the bus bars 131 of each unit cell 110 to obtain the desired electrical characteristics of the battery pack 100, regardless of deformation of the distal end portion 113d of each electrode tab 113. In addition, in the battery pack 100 manufacturing method, it is possible to sufficiently weld the electrode tabs 113 and the bus bars 131 of each unit cell 110, regardless of deformation of the distal end portion 113d of each electrode tab 113.

Furthermore, the bus bar 131 electrically connects the electrode tabs on the positive electrode side (anode side electrode tab 113A) of one group of unit cells 110 in parallel, and electrically connects the electrode tabs on the negative electrode side (cathode side electrode tab 113K) of another group of unit cells 110 in parallel.

According to such a configuration, since a predetermined number of unit cells 110 can be electrically connected in parallel regardless of variation in the thickness of each unit cell 110, the battery pack 100 can obtain the desired electrical characteristics corresponding to the current value.

Furthermore, the bus bar 131 is formed by bonding a first bus bar (anode side bus bar 131A) to be connected to the electrode tabs on the positive electrode side (anode side electrode tab 113A) of one of the unit cells 110, and a second bus bar (cathode side bus bar 131K) to be connected to the electrode tabs on the negative electrode side (cathode side electrode tab 113K) of another of the unit cells 110.

According to such a configuration, it is possible to form a bus bar 131 by bonding, to each other, an anode side bus bar 131A made of a material suitable for the anode side electrode tab 113A and a cathode side bus bar 131K made of a material suitable for the cathode side electrode tab 113K. That is, the bus bar 131 may be configured by mutually bonding the anode side portion and the cathode side portion, which are separate bodies and made of different materials.

Furthermore, the battery pack 100 comprises a bus bar holder 132 that integrally holds each of the bus bars 131.

According to such a configuration, each of the bus bars 131 can be brought into close contact with each of the corresponding distal end portions 113d of the electrode tabs 113 by the bus bar holder 132. Therefore, the relative positions of the bus bars 131 (positions along the longitudinal direction X) will not differ, and it is possible to obtain sufficient conduction between the electrode tabs 113 and the bus bars 131 to obtain the desired electrical characteristics of the battery pack 100. In addition, in the battery pack 100 manufacturing method, it is not necessary to individually abut each bus bar 131 to each corresponding electrode tab 113. Therefore, it is possible to improve the productivity of the battery pack 100. Additionally, in the battery pack 100 manufacturing method, it is possible to evenly press each bus bar 131 against each corresponding electrode tab 113 with the bus bar holder 132. Therefore, each of the electrode tabs 113 corresponding to each of the bus bars 131 can obtain a uniform bonding strength.

Furthermore, the bus bar holder 132 comprises an insulating portion 132c having insulating properties that protrudes between adjacent bus bars 131 along the stacking direction Z.

According to such a configuration, the battery pack 100 is able to prevent short circuiting by avoiding discharge between bus bars 131 that are adjacent along the stacking direction Z. Therefore, the battery pack 100 is able to stably maintain its electrical characteristics. In addition, in the battery pack 100 manufacturing method, it is possible to reliably dispose the insulating portion 132c between all of the bus bars 131 that are required, by using a bus bar holder 132 provided with an insulating portion 132c as the bus bar holder 132.

Furthermore, each of the distal end portions 113d of the stack of the unit cells 110 are folded aligned in one direction of the stacking direction Z of the unit cells 110.

According to such a configuration, the distal end portions 113d of unit cells 110 that are adjacent along the stacking direction Z protrude so as to be aligned upward or downward in the stacking direction Z. Therefore, since each of the distal end portions 113d of the unit cells 110 that are adjacent to each other along the stacking direction Z is able to easily avoid interference in the stacking direction Z, compared to a configuration in which, for example, the distal end portions alternately protrude upward and downward in the stacking direction Z, it is possible to improve the lamination efficiency of the unit cells 110.

Furthermore, the electrode tabs 113 on the positive electrode side and the negative electrode side of the unit cell 110 protrude out from one edge from among the edges of the cell body 110H, and the electrode tabs 113 of all of the stacked unit cells 110 are disposed on the same side.

According to such a configuration, since it is possible to complete the bonding between the electrode tabs 113 and the bus bars 131 on the same plane of the battery pack 100, for example, unlike a case in which the electrode tabs 113 are disposed on a plurality of planes of the battery pack 100, it is unnecessary to change setups during manufacturing. A setup change during manufacturing refers to, for example, rotating the battery pack 100 during manufacture according to the orientation of the laser oscillator 705 for welding. If a plurality of laser oscillators 705 are installed so as to face a plurality of planes of the battery pack 100, the cost required for manufacturing the battery pack 100 increases. In this manner, by disposing the electrode tabs 113 of all of the unit cells 110 on the same side, it is possible to improve the productivity of the battery pack 100, and to configure the battery pack 100 at a low cost.

Second Embodiment

Figure 18:
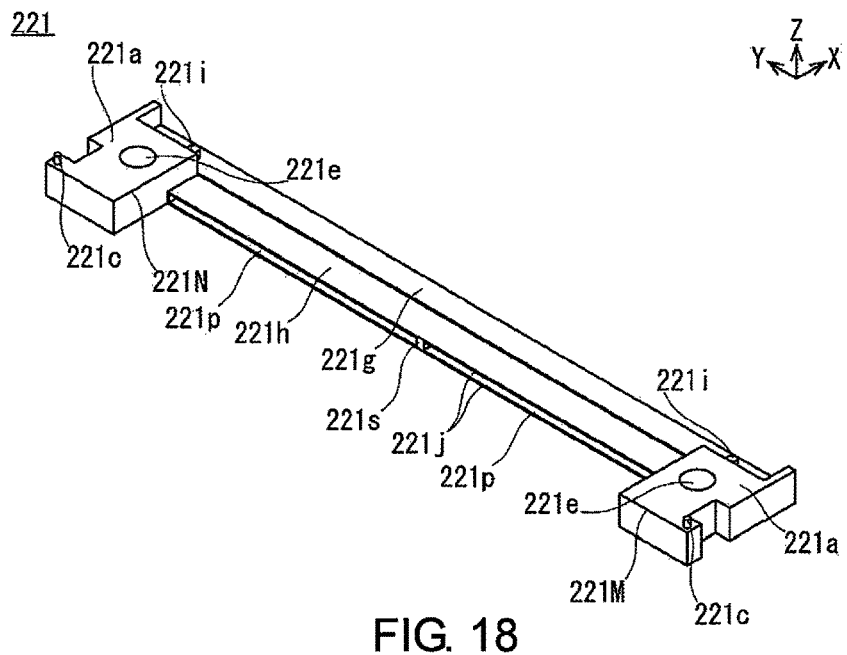
FIG. 18 is a perspective view illustrating the first spacer of the battery pack according to the second embodiment.
Figure 19:
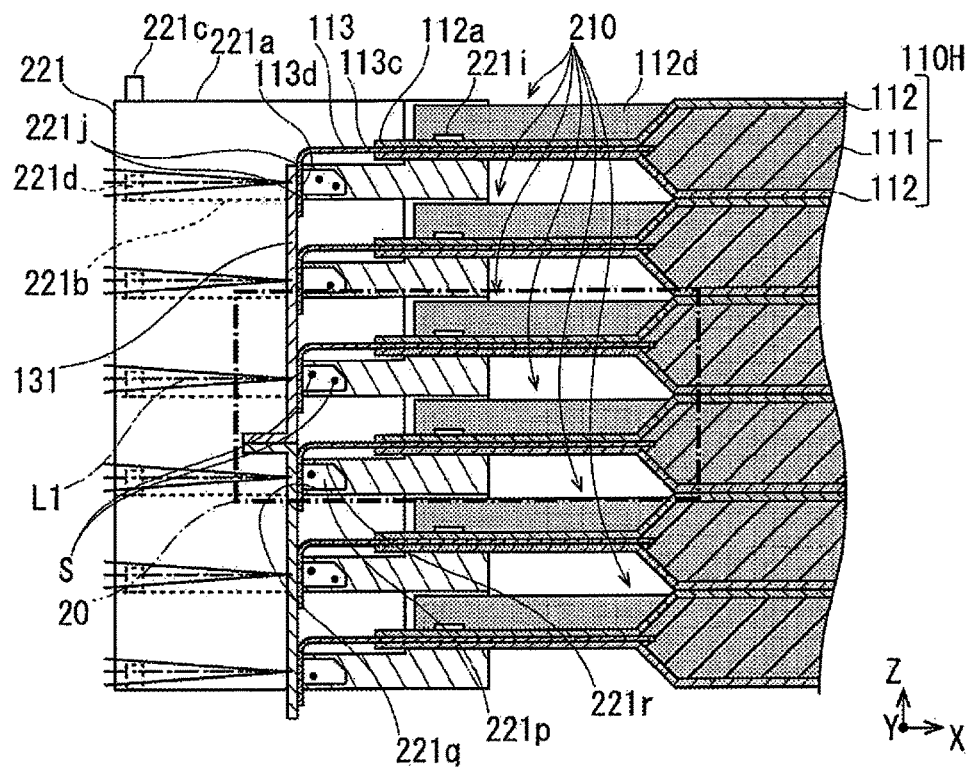
FIG. 19 is a side view illustrating a cross-section of the principle part of a state in which the bus bar is laser-welded to the electrode tabs of the stack of the unit cells.
Figure 20:
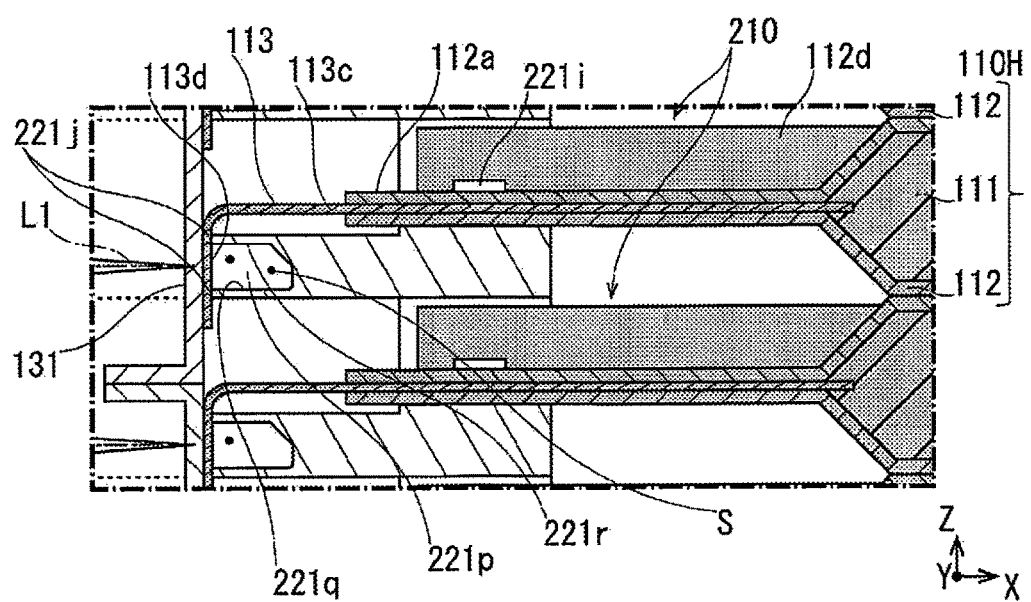
FIG. 20 is an enlarged side view of region 20, as illustrated in FIG. 19.

FIG. 18 is a perspective view illustrating the first spacer 221 of the battery pack according to the second embodiment. FIG. 19 is a side view illustrating a cross-section of the principle part of a state in which the bus bar 131 is laser-welded to the electrode tabs 113 of the stacked unit cells 210. FIG. 20 is an enlarged side view of region 20 as illustrated in FIG. 19. Members that are the same as those of the battery pack 100 according to the first embodiment are given the same reference symbols, and descriptions thereof are omitted.

The battery pack according to the second embodiment is different from the battery pack 100 according to the first embodiment described above in that the first spacer 221 prevents damage accompanying laser welding by means of a recess 221p provided in a position corresponding to the welding area of the bus bar 131 and the electrode tab 113.

First, the first spacer 221 of the battery pack will be described with reference to FIGS. 18-20.

In the first spacer 221, the supporting portion 221j abuts the distal end portion 113d of the electrode tab 113, as illustrated in FIG. 19 and FIG. 20. The recess 221p has a shape provided with an opening along the longitudinal direction X of the supporting portion 221j, as illustrated in FIG. 18. A pair of recesses 221p are formed along the longitudinal direction X across a central portion 221s provided in the central portion of the supporting portion 221j, corresponding to the welding area between the bus bar 131 and the electrode tab 113. The recess 221p seals the periphery of the welding area of the electrode tab 113, in a state in which the supporting portion 221j abuts the distal end portion 113d of the electrode tab 113, as illustrated in FIG. 19 and FIG. 20.

In the recess 221p of the first spacer 221, the bottom surface 221q positioned on the lower side of the stacking direction Z of the unit cell 210 is formed larger than the top surface 221r positioned on the upper side of the stacking direction Z of the unit cell 210, as illustrated in FIG. 20. That is, in the recess 221p, the bottom surface 221q side is deeper than the top surface 221r side toward the cell body 110H side (longitudinal direction X).

The depth of the recess 221p is determined based on conditions such as the material and thickness of the electrode tabs 113, the material and thickness of the bus bars 131, the intensity and depth of focus of the laser light L1, the type of welding (seam welding or spot welding), and the material, etc. of the first spacer 221. For example, one of the pair of recesses 221p faces the anode side electrode tab 113A made of aluminum. In the same manner, the other of the pair of recesses 221p faces the cathode side electrode tab 113K made of copper. Therefore, the depths of the pair of recesses 221p may be individually optimized according to the material of the electrode tab 113.

Next, the manufacturing method of the battery pack will be described with reference to FIG. 19 and FIG. 20.

The supporting portion 221j of the first spacer 221 is brought into contact with the distal end portion 113d of the electrode tab 113 from the opposite side of the bus bar 131. In this state, laser light L1 for welding is irradiated on the bus bar 131 so as to correspond to the positions of the recesses 221p of the first spacer 221, and each of the distal end portions 113d and the bus bars 131 are subjected to seam welding or spot welding. The recess 221p blocks the propagation of heat of the electrode tabs 113 and bus bars 131, which are heated and melted by the irradiation of the laser light L1 for welding. The recess 221p accommodates the sputter S generated from the electrode tabs 113 and bus bars 131 by the irradiation of the laser light L1.

According to the battery pack of the second embodiment described above, in addition to the action and effects of the battery pack 100 according to the first embodiment, the following action and effects are achieved.

In the battery pack according to the second embodiment, the first spacer 221 is provided with a recess 221p having an opening along the direction that intersects with the stacking direction Z (longitudinal direction X), in a position corresponding to the welding area between the bus bar 131 and the electrode tab 113.

In the battery pack manufacturing method, a spacer (first spacer 221), comprising a supporting portion 221j for supporting the distal end portion 113d and a recess 221p that is opened in the supporting portion 221j, is disposed between the electrode tabs 113 of the stacked unit cells 210. In this battery pack manufacturing method, the supporting portion 221j is abutted on the distal end portion 113d from the opposite side of the bus bar 131, and laser light L1 for welding is irradiated on the bus bar 131 so as to correspond to the position of the recess 221p, to weld each of the distal end portions 113d and bus bars 131.

According to such a configuration, when welding the bus bar 131 and the distal end portion 113d of each electrode tab 113, it is possible to avoid the propagation of heat of the electrode tabs 113 and bus bars 131, which are heated and melted by the irradiation of the laser light L1 for welding, by the recess 221p of the first spacer 221, which is separated from the welding area. Therefore, when laser welding the bus bar 131 and each electrode tab 113, it is possible to prevent damage to the first spacer 221.

In addition, according to such a configuration, when welding the bus bar 131 and the distal end portion 113d of each electrode tab 113, there are no cases in which the material constituting the first spacer 221 melts and is mixed in with the electrode tab 113, and the like. Therefore, it is possible to prevent an increase in the electrical resistance of the electrode tab 113, and the like, and a decrease in the mechanical strength of the electrode tab 113, and the like, caused by the mixing of the material that constitutes the first spacer 221.

Furthermore, the recess 221p seals at least a portion of the periphery of the welding area of the electrode tab 113.

According to such a configuration, when welding the bus bar 131 and the distal end portion 113d of each electrode tab 113, it is possible to accommodate and confine the sputter S, which is generated from the electrode tab 113 and the bus bar 131 by the irradiation of the laser light L1 for welding, in the recess 221p. Therefore, it is possible to prevent sputter S that is generated from the welding area of the electrode tab 113 and the bus bar 131 from being spread outside, to contaminate the component members constituting the fuel cell.

Furthermore, in the recess 221p, the bottom surface 221q positioned on the lower side of the stacking direction Z of the unit cell 210 is formed larger than the top surface 221r positioned on the upper side of the stacking direction Z of the unit cell 210.

According to such a configuration, the sputter S generated from the electrode tabs 113 and bus bars 131 by the irradiation of the laser light L1 for welding is attenuated while being made to easily diffuse to the lower side in the recess 221p, to prevent the sputter S from being channeled back to the electrode tab 113 side. Therefore, it is possible to prevent the sputter S generated from the welding area of the electrode tab 113 and the bus bar 131 from mixing into the welding area, causing a reduction in the electrical characteristics, and the like.

Third Embodiment

Figure 21A:
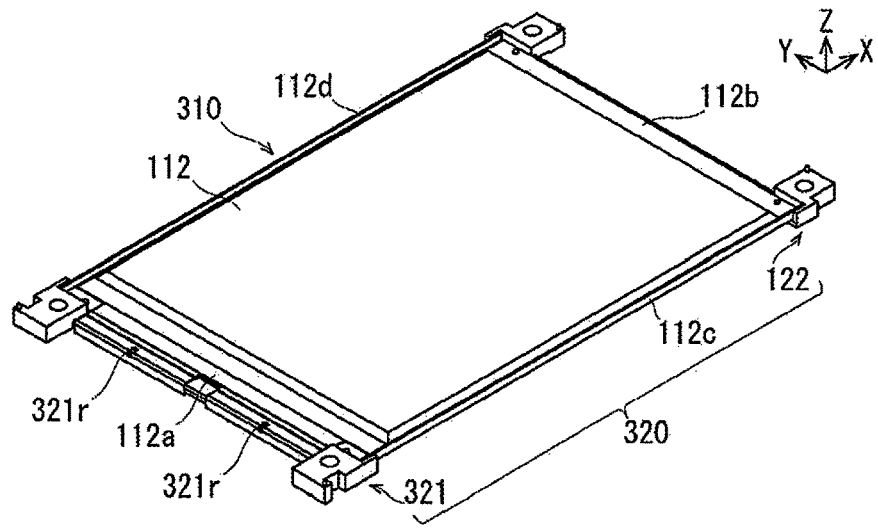
FIG. 21A is a perspective view illustrating a state in which a pair of spacers (first spacer and second spacer) are attached to a unit cell in a battery pack according to a third embodiment.
Figure 21B:
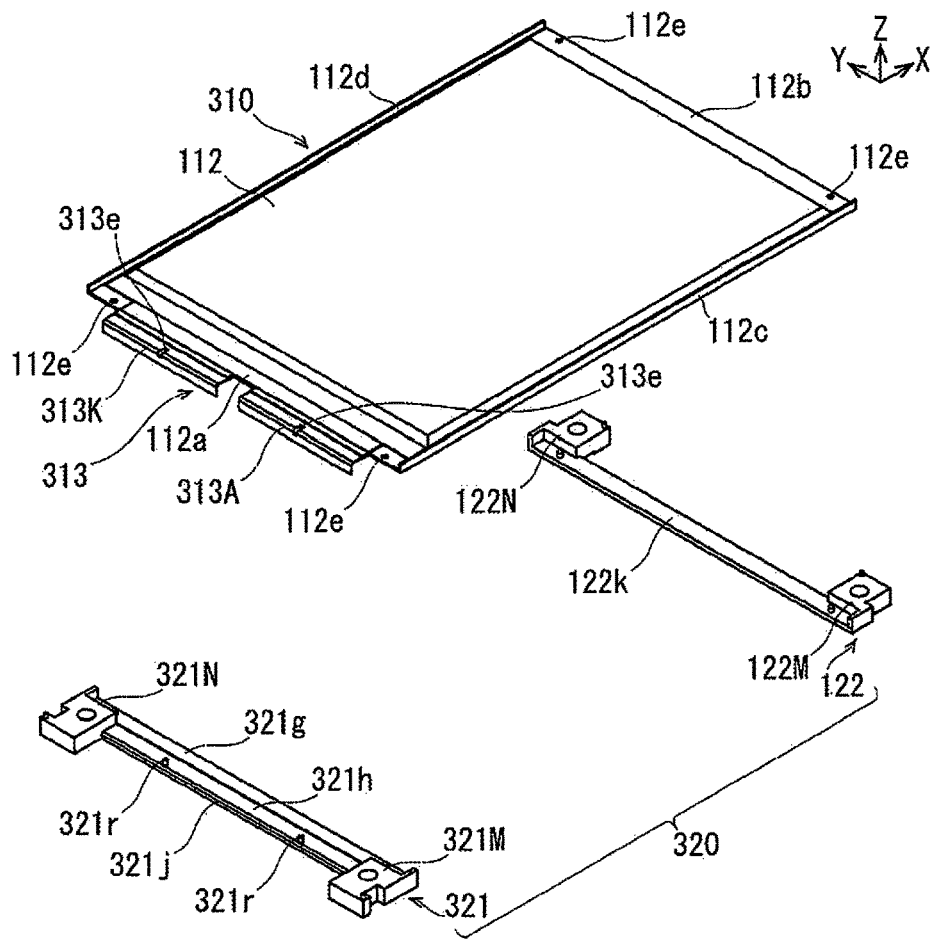
FIG. 21B is a perspective view illustrating a state before the pair of spacers (first spacer and second spacer) are attached to the unit cell in the battery pack according to the third embodiment.
Figure 22A:
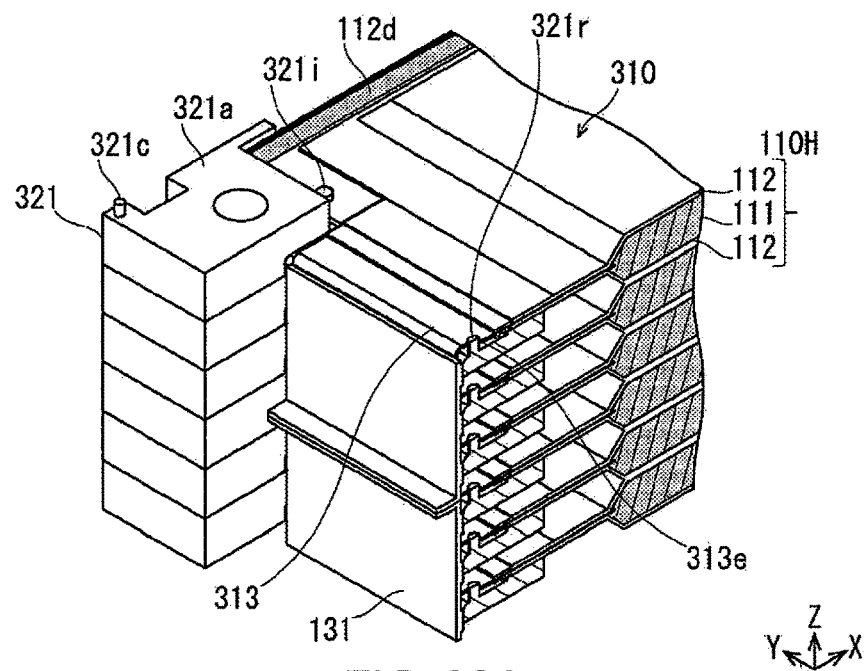
FIG. 22A is a perspective view illustrating a cross-section of the principle part of a state in which a bus bar is bonded to the electrode tabs of stack of the unit cells.
Figure 22B:
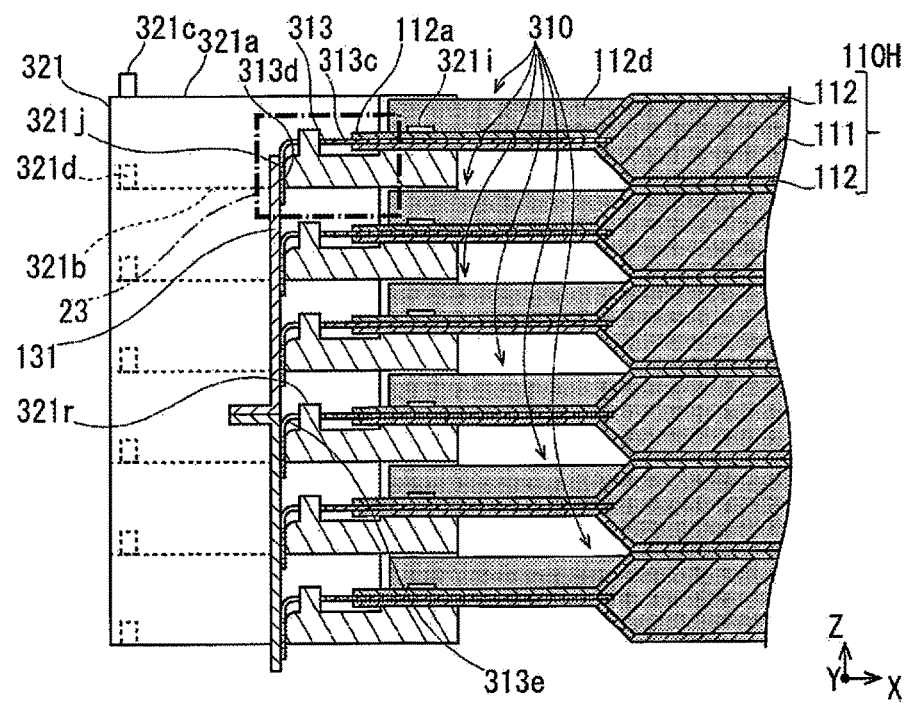
FIG. 22B is a side view illustrating FIG. 22A as viewed from the side.
Figure 23:
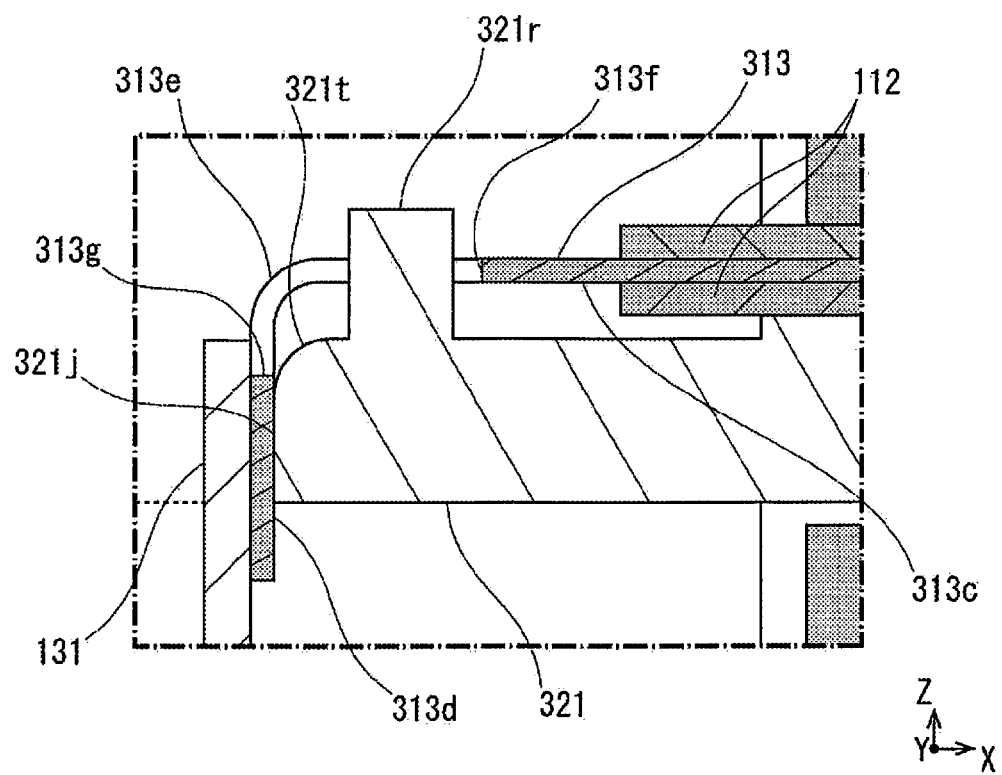
FIG. 23 is an enlarged side view of region 23, as illustrated in FIG. 22B.
Figures 24A, 24B:
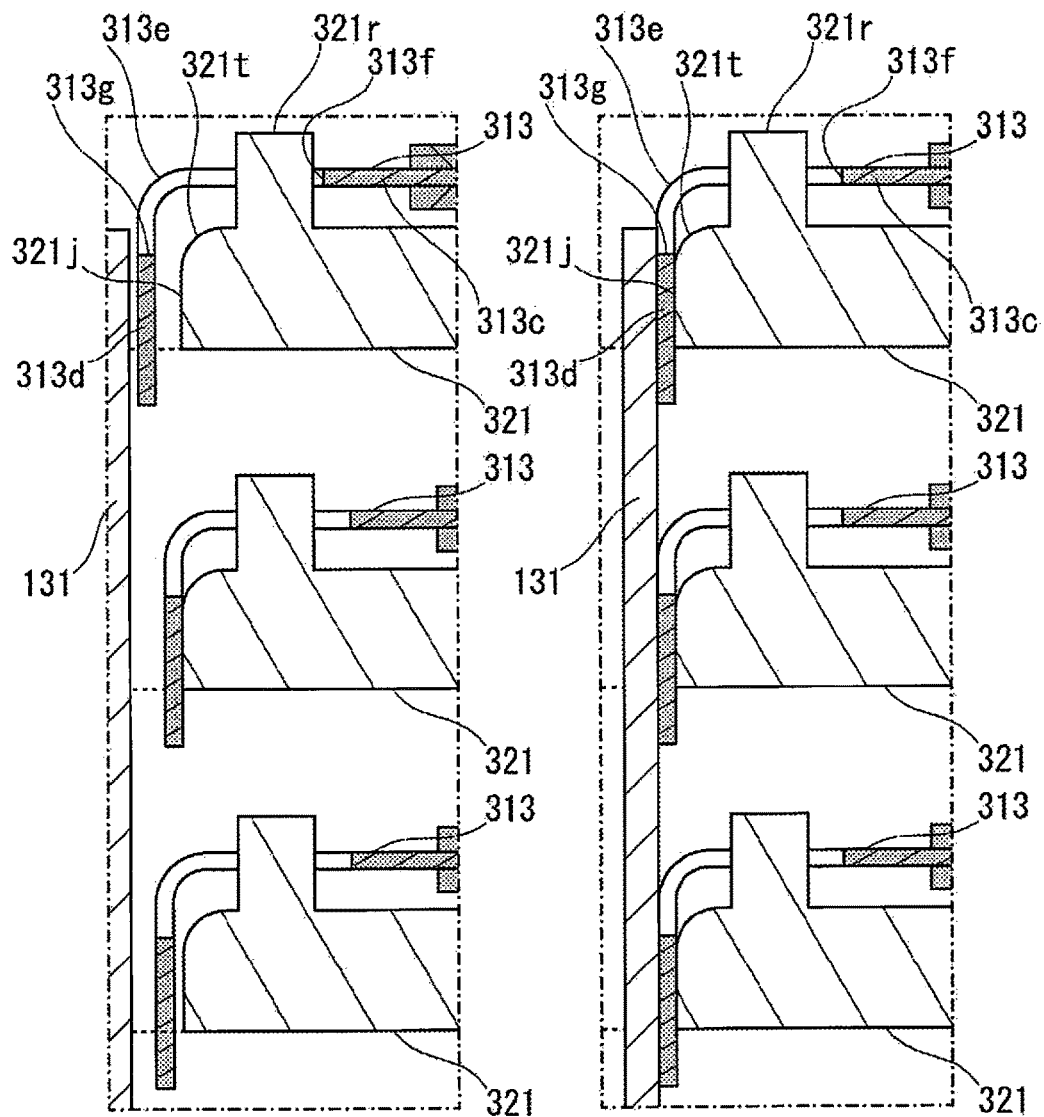
FIG. 24A is a side view schematically illustrating a cross-section of a state before the distal end portions of each of the electrode tabs are moved toward the first spacer by the bus bar.
FIG. 24B is a side view schematically illustrating a cross-section of a state after the distal end portions of each of the electrode tabs are moved toward the first spacer.

In the battery pack according to the third embodiment, FIG. 21A is a perspective view illustrating a state in which a pair of spacers (first spacer and second spacer) are attached to a unit cell 310, and FIG. 21B is a perspective view illustrating a state before the pair of spacers (first spacer and second spacer) are attached to the unit cell 310. FIG. 22A is a perspective view illustrating a cross-section of the principle part of a state in which a bus bar 131 is bonded to the electrode tabs 313 of the stacked unit cells 310, and FIG. 22B is a side view illustrating FIG. 22A as viewed from the side. FIG. 23 is an enlarged side view of region 23 illustrated in FIG. 22B. FIG. 24A is a side view schematically illustrating a cross-section of a state before the distal end portions 313d of each of the electrode tabs 313 are moved toward the first spacer 321 by the bus bar 131, and FIG. 24B is a side view schematically illustrating a cross-section of a state after the distal end portions 313d of each of the electrode tabs 313 are moved toward the first spacer 321. Members that are the same as those of the battery pack 100 according to the first embodiment are given the same reference symbols, and descriptions thereof are omitted.

The battery pack according to the third embodiment is different from the battery pack 100 according to the first embodiment described above in the point that a rib 321r of the first spacer 321 is inserted into a hole 313e of the electrode tab 313, to regulate and guide the position of the electrode tab 313.

First, the first spacer 321 and the electrode tab 313 of the battery pack will be described with reference to FIGS. 21-23.

The electrode tab 313 is provided with a hole 313e opened along the stacking direction Z at the proximal end portion 313c thereof, as illustrated in FIGS. 21-23. The hole 313e is formed in an elongated shape along the longitudinal direction X of the electrode tab 313. The hole 313e extends from the proximal end portion 313c to the distal end portion 313d of the electrode tab 313, as illustrated in FIG. 23. The electrode tab 313 is freely movable in the range from one end 313f to the other end 313g of the hole 313e in the longitudinal direction X, in a state in which the rib 321r of the first spacer 321 is inserted into the hole 313e.

The first spacer 321 is disposed between the electrode tabs 313 of the stacked unit cells 310. The first spacer 321 is provided with a supporting portion 321j, which abuts the electrode tab 313 from the opposite side of the bus bar 131 and supports the distal end portion 313d of the electrode tab 313. Here, the first spacer 321 is provided with a pair of ribs 321r, which is inserted into the hole 313e of the electrode tab 313 to guide the electrode tab 313, on a second supporting surface 321h. The rib 321r guides the movement of the electrode tab 313 while regulating the position of the electrode tab 313, via the hole 313e of the electrode tab 313. The first spacer 321 is provided with a notched portion 321t at the boundary between the distal end portion 313d and the proximal end portion 313c of the electrode tab 313 (boundary between the second supporting surface 321h and the supporting portion 321j.

Next, the manufacturing method of the battery pack will be described with reference to FIG. 24.

As schematically illustrated in FIG. 24A, the position of the distal end portion 313d of each electrode tab 313 is relatively shifted along a direction that intersects with the stacking direction Z (longitudinal direction X). Of the three illustrated electrode tabs 313, the distal end portion 313d of the central electrode tab 313 is abutted on the supporting portion 321j of the corresponding first spacer 321. On the other hand, of the three illustrated electrode tabs 313, the distal end portion 313d of each of the upper and lower electrode tabs 313 is abutted on the supporting portion 321j of the corresponding first spacer 321. The interval between the distal end portion 313d and the supporting portion 321j of the first spacer 321 is different between the upper electrode tab 313 and the lower electrode tab 313.

As schematically illustrated in FIG. 24B, the bus bar 131 is moved along the longitudinal direction X, and the distal end portion 313d of each electrode tab 313 is pressed against the supporting portion 321j of each corresponding first spacer 321. Of the three electrode tabs 313, each of the proximal end portions 313c thereof is slightly bent when moving toward the first spacer 321. In this state, laser light L1 for welding is irradiated on the bus bar 131 to weld the bus bar 131 and the distal end portion 313d of each electrode tab 313. Here, the configuration may be such that each unit cell 310 is moved slightly toward the bus bar 131 side in advance, and each electrode tab 313 is pressed while being sufficiently biased toward the first spacer 321 side by the bus bar 131.

According to the battery pack of the third embodiment described above, in addition to the action and effects of the battery pack 100 according to the first embodiment, the following action and effects are achieved.

The battery pack comprises the cell group, the bus bar 131, and the spacer (first spacer 321). The cell group is obtained by stacking, in the thickness direction, a plurality of unit cells 310 provided with a cell body 110H, which includes a power generation element 111 and which is formed into a flat shape, and an electrode tab 313 protrude out from the cell body 110H, and the distal end portions 313d of the electrode tabs 313 are bent in the stacking direction Z of the unit cells 310. The bus bar 131 is formed in a flat plate shape and bonded to the distal end portions 313d of the electrode tabs 313 of the unit cells 310 while facing the distal end portions 313d, and electrically connects the electrode tabs 313 of at least two of the unit cells 310 with each other. The first spacer 321 is disposed between the electrode tabs 313 of the stacked unit cells 310. The electrode tab 313 is provided with a hole 313e opened along the stacking direction Z at the proximal end portion 313c thereof. The first spacer 321 is provided with a supporting portion 321j, which abuts the electrode tab 313 from the opposite side of the bus bar 131 and supports the distal end portion 313d of the electrode tab 313, and a rib 321r that is inserted into the hole 313e of the electrode tab 313 and guides the electrode tab 313.

The battery pack manufacturing method uses a cell group, a bus bar 131, and a spacer (first spacer 321). The cell group is obtained by stacking, in the thickness direction, a plurality of unit cells 310 provided with a cell body 110H, which includes a power generation element 111 and which is formed into a flat shape, and an electrode tab 313 protrude out from the cell body 110H, the distal end portions 313d of the electrode tabs 313 are bent in the stacking direction Z of the unit cells 310, and a hole 313e is provided on the proximal end portions 313c of the electrode tab 313. The bus bar 131 is formed in a flat plate shape and disposed so as to face the distal end portions 313d of the electrode tab 313 of the unit cell 310, and electrically connects the distal end portions 313d to each other. The first spacer 321 is provided with a supporting portion 321j, which is arranged between the electrode tabs 313 of the stacked unit cells 310 and abuts the electrode tab 313 from the opposite side of the bus bar 131 to support the distal end portion 313d of the electrode tab 313, and a rib 321r that is inserted into the hole 313e and guides the electrode tab 313. In this battery pack manufacturing method, the bus bar 131 and the distal end portion 313d of each electrode tab 313 are relatively moved along the direction that intersects with the stacking direction Z, and the distal end portion 313d of each electrode tab 313 is abutted on each of the supporting portions 321j whose positions have been aligned along the stacking direction Z, after which the bus bar 131 and the electrode tabs 313 of at least two of the unit cells 110 are welded to each other.

According to a battery pack and a battery pack manufacturing method configured in this manner, the bus bar 131 is disposed so as to face the distal end portion 313d of each electrode tab 313, and the position of the electrode tab 313 is guided while being regulated by the rib 321r of the first spacer 321 via the hole 313e of the electrode tab 313. In this manner, it is possible to cause each of the electrode tabs 313 and bus bars 131 to be sufficiently brought into contact along the supporting portion 321j of each first spacer 321, even if the relative position of each electrode tab 313 is shifted, due to variation in the position of each unit cell 310 along the direction that intersects with the stacking direction. Therefore, according to the battery pack and the battery pack manufacturing method, it is possible to obtain sufficient conduction between the electrode tabs 313 and the bus bars 131 of each unit cell 310, regardless of variation in the position of each unit cell 310 along the direction that intersects with the stacking direction Z.

In particular, according to a battery pack manufacturing method configured in this manner, it is possible to align the positions of the bus bars 131 and the electrode tabs 313 of the unit cells 310 in a planar shape, by guiding while regulating the positions of the electrode tabs 313, in a state in which the rib 321r of the first spacer 321 is inserted into the hole 313e of the electrode tab 313. According to such a battery pack manufacturing method, it is possible to stabilize the gaps of a non-welded object, which is considered to be important in a welding method using a non-contact heat input method, as typified by laser welding.

Furthermore, the hole 313e of the electrode tab 313 is formed in an elongated shape along a direction that faces the bus bar 131 (longitudinal direction X).

According to such a configuration, when the electrode tab 313 moves toward the supporting portion 321j of the first spacer 321, it is possible to prevent the electrode tab 313 from being damaged due to the hole 313e of the electrode tab 313 interfering with the rib 321r of the first spacer 321.

In addition, according to such a configuration, during operation of the battery pack (charging or discharging), in a case in which the electrode tab 313 is pulled toward the cell body 110H side due to expansion of the cell body 110H, the hole 313e of the electrode tab 313 does not readily come in contact with the rib 321r of the first spacer 321. Therefore, it is possible to suppress damage in the electrode tab 313 caused by expansion of the cell body 110H.

Furthermore, the hole 313e of the electrode tab 313 extends to the distal end portion 313d.

According to such a configuration, it is possible to widely absorb variation in the position of each electrode tab 313 with respect to the direction that intersects with the stacking direction of the unit cells 310, to guide while regulating the position of the electrode tab 313 by the rib 321r of the first spacer 321.

Furthermore, the first spacer 321 is provided with a notched portion 321t formed by cutting out a portion that faces the boundary between the distal end portion 313d and the proximal end portion 313c of the electrode tab 313.

According to such a configuration, it is possible to absorb changes in the dimension of the electrode tab 313 along the stacking direction Z by the gap that is generated at the notched portion 321t of the first spacer 321, to cause the distal end portion 313d of the electrode tab 313 to sufficiently abut the supporting portion 321j of the first spacer 321. In addition, according to such a configuration, it is possible to cause the distal end portion 313d of the electrode tab 313 to sufficiently abut the supporting portion 321j of the first spacer 321, regardless of error in the shape of the folded portion of the electrode tab 313 or error in the shape of the end portion of the first spacer 321.

In the battery pack manufacturing method, the bus bars 131 are formed in an elongated shape along a direction in which the holes 313e face the bus bars 131 (longitudinal direction X) to bring the electrode tabs 313 and the first spacers 321 in contact, and the inner perimeter surfaces of the holes 313e of the electrode tabs 313 and the outer perimeter surfaces of the ribs 321r of the first spacers 321 are brought into contact along the direction that intersects with the stacking direction Z (longitudinal direction X) while the electrode tab 313 is moved.

According to such a configuration, it is possible to accurately move the electrode tab 313 on a plane that is formed by the longitudinal direction X and the short side direction Y while being aligned with the rib 321r of the first spacer 321. Therefore, it is possible to cause each electrode tab 313 and bus bar 131 to accurately come in contact with the supporting portion 321j of each first spacer 321.

Other than the foregoing, various modifications to the present invention based on the configurations described in the Claims are possible, which also belong to the scope of the present invention.

The invention claimed is:

1. A battery pack comprising:
a cell group obtained by stacking a plurality of unit cells in a thickness direction, the unit cells each including a cell body having a power generation element and a flat shape, and an electrode tab protruding out from the cell body, and the electrode tabs having distal end portions bent in a stacking direction of the unit cells; and
a flat plate shape bus bar connecting the distal end portions of the electrode tabs of the unit cells while facing the distal end portions, and electrically connecting the electrode tabs of at least two of the unit cells with each other, wherein:
each of the distal end portions of the electrode tabs of at least two of the unit cells and a surface of the bus bar that faces the unit cells are in contact and welded to each other,
the distal end portions of the electrode tabs that are electrically connected by the bus bar are bent in a same direction,
the cell group comprises spacers disposed between the electrode tabs of the unit cells that are stacked, the spacers including supporting portions that abut the electrode tabs from an opposite side of the bus bar to support the distal end portions of the electrode tabs, and
each of the spacers are attached to a respective one of the unit cells.

2. The battery pack according to claim 1, wherein
the electrode tabs are each formed by being bent in an L shape from proximal end portions adjacent to the cell bodies to the distal end portions as seen from a side of the unit cells, and are each mutually joined where flat portions of the distal end portions and the bus bar overlap.

3. The battery pack according to claim 1, wherein
the spacers include recesses having an opening along a direction that intersects with the stacking direction in positions corresponding to welding areas of the bus bar and the electrode tabs.

4. The battery pack according to claim 3, wherein
the recesses seal at least a portion of a periphery of the welding areas of the electrode tabs.

5. The battery pack according to claim 4, wherein
the recesses each includes a bottom surface positioned on a lower side of the stacking direction of the unit cells that is larger than a top surface positioned on an upper side of the stacking direction of the unit cells.

6. The battery pack according to claim 1, wherein
the bus bar electrically connects the electrode tabs on a positive electrode side of one group of the unit cells in parallel, and electrically connects the electrode tabs on a negative electrode side of another group of the unit cells in parallel.

7. The battery pack according to claim 1, wherein
the bus bar includes a first bus bar bonded to the electrode tabs on the positive electrode side of one of the unit cells, and a second bus bar bonded to the electrode tabs on the negative electrode side of another of the unit cells.

8. The battery pack according to claim 7, further comprising
a bus bar holder for integrally holding the first bus bar and the second bus bar.

9. The battery pack according to claim 8, wherein
the bus bar holder comprises an insulating portion having insulating properties that protrudes between the bus bars that are adjacent along the stacking direction.

10. The battery pack according to claim 1, wherein
each of the electrode tabs on the positive electrode side and the negative electrode side of the unit cells protrudes out from one edge from among edges of the cell body, and the electrode tabs of all of the unit cells are disposed on a same side.

* * * * *